(12) United States Patent
Mills et al.

(10) Patent No.: US 12,215,615 B2
(45) Date of Patent: Feb. 4, 2025

(54) TURBINE

(71) Applicant: Cummins LTD, London (GB)

(72) Inventors: Matthew Mills, Yorkshire (GB); Nicholas Kenneth Sharp, Yorkshire (GB); Alan Haigh, Yorkshire (GB); Atif Mahmood, Yorkshire (GB); David Scott, Yorkshire (GB); Thomas Ogilvie, Yorkshire (GB)

(73) Assignee: CUMMINS LTD, London (GB)

( * ) Notice: Subject to any disclaimer, the term of this patent is extended or adjusted under 35 U.S.C. 154(b) by 0 days.

(21) Appl. No.: 18/268,183

(22) PCT Filed: Dec. 16, 2021

(86) PCT No.: PCT/GB2021/053328
§ 371 (c)(1),
(2) Date: Jun. 16, 2023

(87) PCT Pub. No.: WO2022/129921
PCT Pub. Date: Jun. 23, 2022

(65) Prior Publication Data
US 2024/0052760 A1    Feb. 15, 2024

(30) Foreign Application Priority Data

Dec. 17, 2020   (GB) .................................... 2020051

(51) Int. Cl.
*F01N 3/20*   (2006.01)
*B33Y 10/00*   (2015.01)
(Continued)

(52) U.S. Cl.
CPC ........... *F01N 3/2066* (2013.01); *F01D 25/24* (2013.01); *F01D 25/30* (2013.01); *F01D 25/305* (2013.01);
(Continued)

(58) Field of Classification Search
CPC ...... F01N 3/2066; F01N 3/20; F01N 2340/06; F01N 2610/1453; F01N 3/206;
(Continued)

(56) References Cited

U.S. PATENT DOCUMENTS

| 8,011,176 B2 | 9/2011 | Hirata |
| 10,422,344 B1 | 9/2019 | Grabowska |

(Continued)

FOREIGN PATENT DOCUMENTS

| DE | 102013223438 A1 | 6/2015 |
| DE | 102018004913 A1 | 12/2018 |

(Continued)

OTHER PUBLICATIONS

Copy of International Preliminary Report on Patentability for International patent application No. PCT/GB2021/053330, filed Dec. 16, 2021, mailed Jun. 13, 2023.

(Continued)

*Primary Examiner* — Brandon D Lee
(74) *Attorney, Agent, or Firm* — Faegre Drinker Biddle & Reath LLP

(57) ABSTRACT

An adapter element for a turbine is disclosed. The adapter element defines a longitudinal axis and comprises a first connection portion, a second connection portion, an outer wall and a dosing structure. The first connection portion is configured to engage the turbine. The second connection portion is configured to engage a conduit. The outer wall extends between the first and second connection portions, the outer wall defining an inner surface and an outer surface. The dosing structure is configured to receive, and expel, reductant.

21 Claims, 11 Drawing Sheets

(51) Int. Cl.
  *B33Y 50/00*    (2015.01)
  *B33Y 80/00*    (2015.01)
  *F01D 25/24*    (2006.01)
  *F01D 25/30*    (2006.01)
  *F02C 6/12*     (2006.01)

(52) U.S. Cl.
  CPC .............. *F01N 3/20* (2013.01); *F02C 6/12* (2013.01); *B33Y 10/00* (2014.12); *B33Y 50/00* (2014.12); *B33Y 80/00* (2014.12); *F01N 2340/06* (2013.01); *F01N 2610/02* (2013.01); *F01N 2610/1453* (2013.01); *F05D 2220/40* (2013.01); *F05D 2240/12* (2013.01); *F05D 2270/08* (2013.01)

(58) Field of Classification Search
  CPC ...... F01N 2610/02; F01D 25/24; F01D 25/30; F01D 25/305; F01D 25/243; F05D 2220/40; F05D 2240/12; F05D 2270/08; Y02T 10/12; F02C 6/12; B33Y 50/00; B33Y 10/00; B33Y 80/00
  See application file for complete search history.

(56) References Cited

U.S. PATENT DOCUMENTS

| | | |
|---|---|---|
| 2003/0136102 A1 | 7/2003 | Nottin |
| 2003/0230072 A1 | 12/2003 | Megas et al. |
| 2007/0175204 A1 | 8/2007 | Shirai |
| 2008/0014103 A1 | 1/2008 | Cooke |
| 2008/0022663 A1 | 1/2008 | Dodge |
| 2010/0319342 A1 | 12/2010 | Brown et al. |
| 2012/0186261 A1* | 7/2012 | Toprani ............... F01D 25/30 60/39.5 |
| 2013/0064656 A1 | 3/2013 | Smatloch |
| 2014/0363357 A1 | 12/2014 | Trivedi |
| 2015/0118015 A1 | 4/2015 | Matys |
| 2015/0240656 A1 | 8/2015 | Ehrhard et al. |
| 2018/0149060 A1* | 5/2018 | Hehle ............... F01N 3/2892 |
| 2018/0274376 A1* | 9/2018 | King ............... B22F 5/10 |
| 2019/0316509 A1* | 10/2019 | Halldorf ............... F02B 37/18 |
| 2020/0116079 A1* | 4/2020 | Sano ............... F02B 37/183 |
| 2020/0173361 A1 | 6/2020 | Brandt et al. |
| 2023/0019174 A1* | 1/2023 | Gawell ............... F01N 3/206 |

FOREIGN PATENT DOCUMENTS

| | | |
|---|---|---|
| EP | 1669566 A1 | 6/2006 |
| EP | 1878888 A1 | 1/2008 |
| EP | 3358148 A2 | 8/2018 |
| GB | 2548582 A | 9/2017 |
| JP | 2009114934 A | 5/2009 |
| WO | 0196718 A1 | 12/2001 |
| WO | 03018177 A1 | 3/2003 |
| WO | 2013112170 A1 | 8/2013 |
| WO | 2016126623 A1 | 8/2016 |
| WO | 2016136313 A1 | 9/2016 |
| WO | 2016173700 A1 | 11/2016 |
| WO | 2018080371 A1 | 5/2018 |
| WO | 2018207754 A1 | 11/2018 |
| WO | 2019211603 A1 | 11/2019 |
| WO | 2020014564 A1 | 1/2020 |
| WO | 2021118428 A1 | 6/2021 |

OTHER PUBLICATIONS

Copy of International Preliminary Report on Patentability for International patent application No. PCT/GB2021/053329, filed Dec. 16, 2021, mailed Jun. 13, 2023.

Copy of International Preliminary Report on Patentability for International patent application No. PCT/GB2021/053328, filed Dec. 16, 2021, mailed Jun. 13, 2023.

Copy of International Search Report and Written Opinion for International Patent Application No. PCT/GB2021/053328, filed Dec. 16, 2021, mailed Apr. 25, 2022.

Copy of International Search Report and Written Opinion for International Patent Application No. PCT/GB2021/053329, filed Dec. 16, 2021, mailed May 11, 2022.

International Preliminary Report on Patentability received for PCT Patent Application No. PCT/GB2021/053328, mailed on Jun. 29, 2023, 11 pages.

* cited by examiner

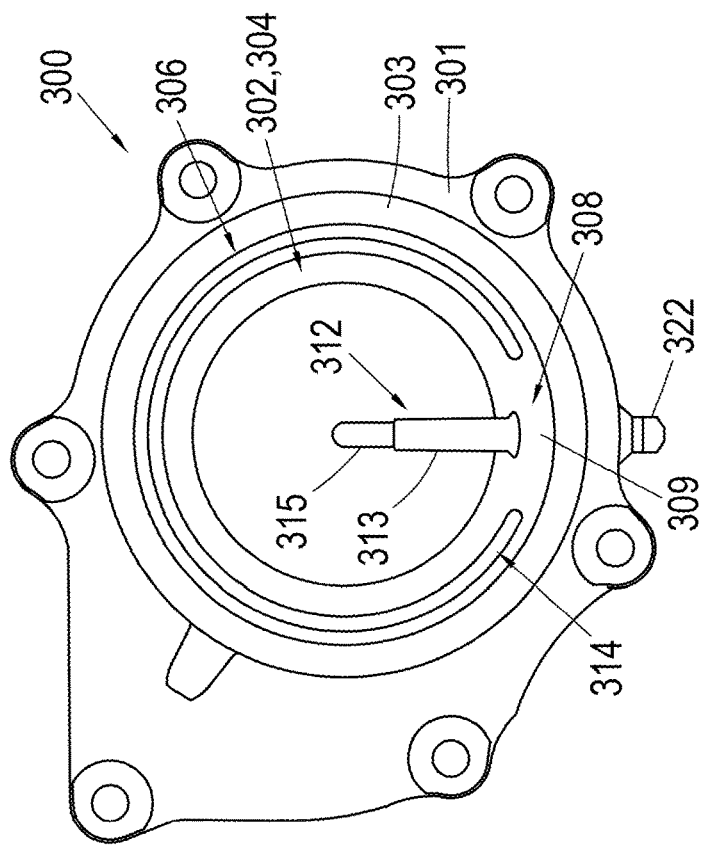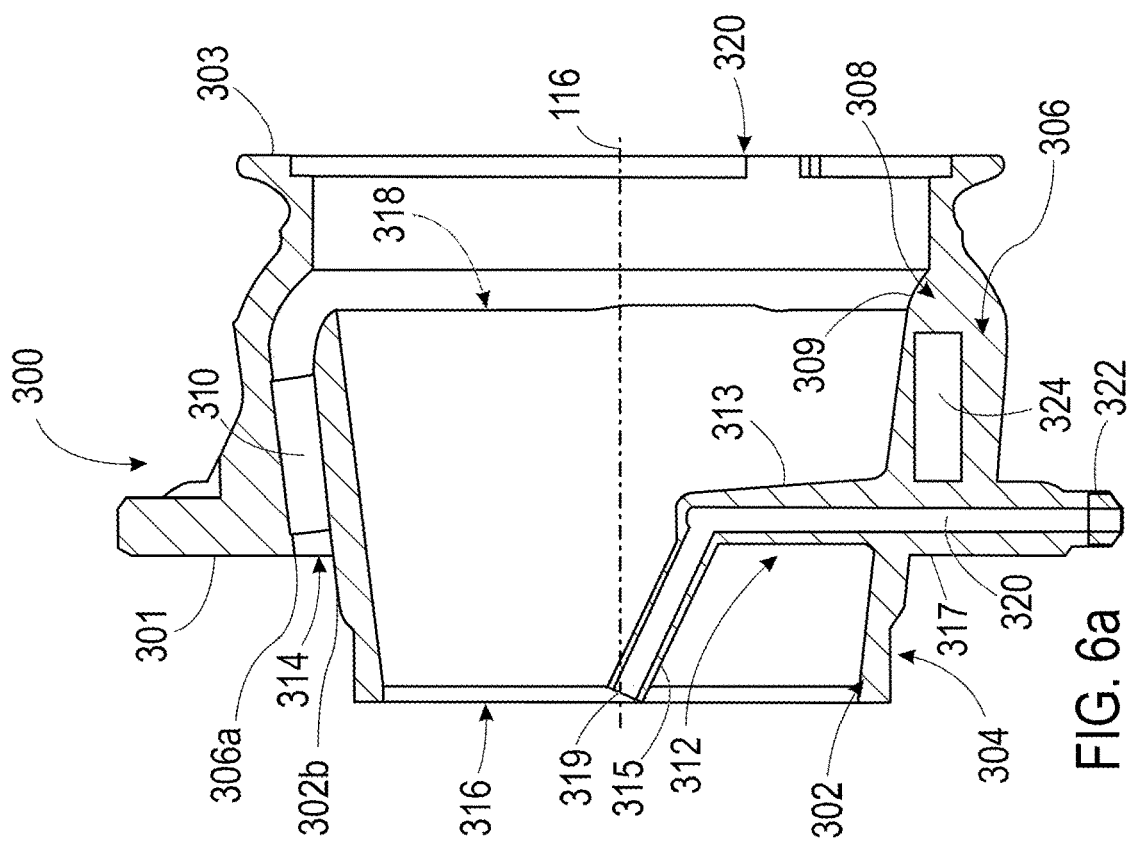

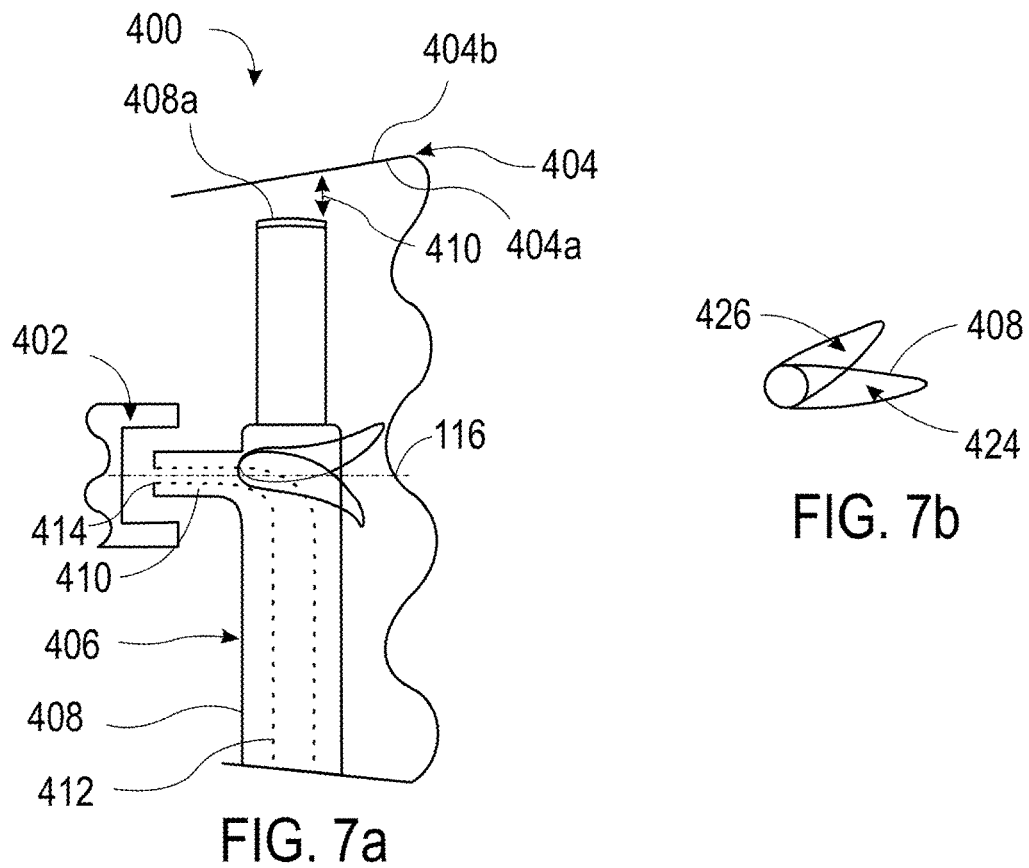
FIG. 7a
FIG. 7b
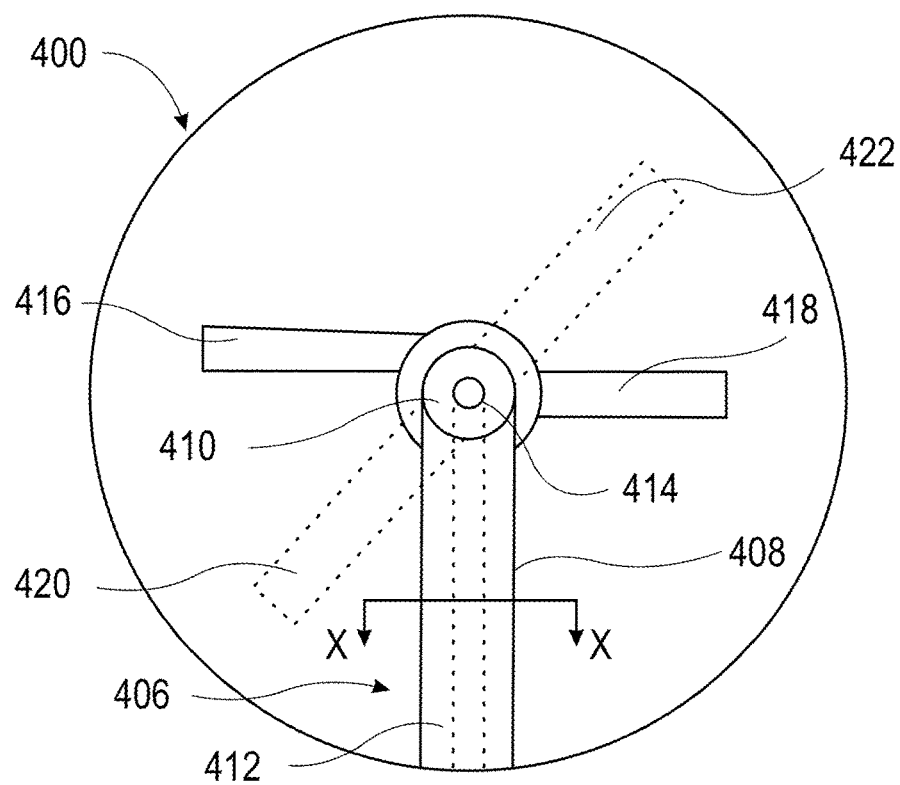
FIG. 7c

TURBINE

CROSS-REFERENCE TO RELATED APPLICATION

This application claims the priority benefit of International Patent Application No. PCT/GB2021/053328, Dec. 16, 2021, which claims priority to GB Patent Application No. 2020051.5, filed Dec. 17, 2020, the entire contents and disclosures of which are incorporated herein by reference.

TECHNICAL FIELD

The present disclosure relates to an adapter element, a diffuser, a turbine assembly, a turbocharger and a method of manufacturing the adapter element and diffuser.

BACKGROUND

Internal combustion engines, such as diesel engines, may emit carbon monoxide, hydrocarbons, particulate matter and nitrogen oxide compounds (NOX) in the exhaust. There are a number of legal requirements throughout the world which govern emission standards, and these requirements are becoming increasingly stringent, particularly in relation to nitrogen oxides (NOX) emissions. To reduce NOX emissions engine manufacturers may make use of exhaust gas recirculation and selective catalytic reduction (SCR).

Selective catalytic reduction (SCR) is an exhaust gas after-treatment, used to convert NOX into compounds that are less reactive, such as diatomic nitrogen and water, with the aid of a catalyst and a reductant. A liquid-reductant agent, such as anhydrous ammonia, aqueous ammonia, or urea, all which may be commonly referred to as Diesel Exhaust Fluid (DEF), is injected into the exhaust stream upstream of the catalyst.

In order to effectively convert the nitrogen oxides of the exhaust gas, the correct amount of DEF for given operating conditions is required, and efficient mixing of the DEF with the exhaust gas flow must also occur.

It is known to dose DEF into a turbine exhaust stream, such as into a dosing cup, to reduce NOX emissions. However, existing solutions lack the desired performance and/or longevity.

SUMMARY

There exists a need to provide an alternative solution that overcomes one or more of the disadvantages of known arrangements, whether mentioned in this document or otherwise.

According to a first aspect of the disclosure there is provided an adapter element for a turbine, the adapter element defining a longitudinal axis and comprising:
  a) a first connection portion configured to engage the turbine;
  b) a second connection portion configured to engage a conduit;
  c) an outer wall that extends between the first and second connection portions, the outer wall defining an inner surface and an outer surface; and
  d) a dosing structure configured to receive, and expel, reductant.

The adapter element refers to a component which is provided between a turbine and a downstream conduit. The adapter element may, for example, interpose a turbine and an exhaust manifold or pipe. The adapter element may engage a turbine housing at one end. The adapter element may engage a conduit at an opposing end. The adapter element may be referred to as a dosing adapter element, or a reductant dosing adapter element, owing to incorporation of the dosing structure.

The first and/or second connection portions facilitate the connection of the adapter element to an adjacent component. The first connection portion may be said to oppose the second connection portion in that they may each be provided at, or proximate, ends of the outer wall. The first connection portion may be configured to engage a turbine housing of the turbine. The second connection portion may be configured to engage a conduit such as a pipe and/or manifold. The connection portion may comprise a flange. The flange may be configured to be engaged by a band clamp, such as a Marman clamp. In use, the flange may be engaged by a flange of the conduit.

The adapter element may be a generally frustoconical body. In other arrangements, the adapter element may be a generally tubular body. As such, the adapter element may be said to comprise a first end and a second end. The first connection portion may be provided at the first end. The second connection portion may be provided at the second end. The outer wall may be a solid wall in that it extends continuously between the first and second connection portions. The outer wall advantageously provides a protective, or shielding, functionality in that the outer wall may be the wall that is externally exposed to contaminants and/or damage in use. Put another way, the diffuser may be shielded by the outer wall.

The dosing structure refers to a component which can dose reductant into a fluid stream. For the purposes of this document, reductant may include, for example, diesel exhaust fluid (DEF) such as urea. The reductant may therefore be liquid. The reductant may flow through the dosing structure and be expelled from the dosing structure towards an inlet of the adapter element. Specifically, the reductant may be expelled towards a turbine wheel, and may be expelled towards a dosing cup which may form part of the turbine wheel. In its simplest form, the dosing structure may be a pipe through which the reductant flows and is expelled, or exits. The reductant may be actively pumped through the dosing structure, for example by a pump, or may trickle out of the dosing structure under gravity.

The dosing structure may project from the outer wall. The dosing structure may project inwardly (i.e. towards a longitudinal axis). The dosing structure may be provided between the first and second connection portions. The dosing structure may be provided within the adapter element (i.e. bound by the first and second connection portions and the inner surface of the wall). The dosing structure may extend into an interior of the adapter element. At least part of the dosing structure may be integrally formed with the outer wall. The dosing structure may be configured to expel reductant into an interior of the adapter element.

The outer wall may be the only wall of the adapter element (i.e. a single skin variant). Alternatively, the adapter element may further comprise an inner wall (e.g. a twin skin variant). The outer wall may be referred to as an exterior wall.

Where the adapter element comprises a diffuser, the longitudinal axis may be defined between an inlet and an outlet of the diffuser (e.g. between centres thereof). Otherwise, the longitudinal axis may be defined between an inlet and an outlet of the adapter element (e.g. between centres thereof).

The incorporation of the adapter element in a turbine is advantageous because a single design of turbine housing can be used for a range of different applications. That is to say, the adapter element can be more readily modified for connection to the conduit as dictated by application requirements. As such, rather than providing a range of different turbine housings, which are a complicated geometry to design and manufacture, the adapter element can be modified depending upon application requirements. A customer can therefore attach their preferred conduit to a downstream end of the adapter element, whilst using a single design of turbine housing for the turbine. This is also advantageous because the dosing structure, which may be a customer specific requirement, can be incorporated in the adapter element when needed, but can be readily omitted by either not including the adapter element, or by using a different design of adapter element. Furthermore, the adapter element can be readily attached to the turbine, and to the conduit, such that the installation is straightforward.

A portion of the inner surface of the outer wall may be outwardly offset proximate the dosing structure.

A portion of the inner surface being outwardly offset is intended to mean that there is a localised outward projection of the inner surface. The wall being outwardly offset proximate the dosing structure is intended to mean that the inner surface is outwardly offset at a position along the longitudinal axis which generally corresponds to the location of the dosing structure. Specifically, the portion of the inner surface may extend longitudinally by around the same extent as at least a base, or strut, of the dosing structure. The inner surface of the outer wall may be outwardly offset by outwardly offsetting the whole outer wall (i.e. both the inner and outer surfaces thereof) or by simply reducing a thickness of the outer wall (i.e. such that the outer surface is otherwise unchanged but a thickness of the wall is reduced).

Advantageously, providing an outwardly offset inner surface of the outer wall means that a linear area schedule can be maintained across the adapter element despite the incorporation of the dosing structure. Incorporation of the dosing structure invariably reduces a cross-sectional area that is available for fluid, from the turbine, to flow through. By providing the outward offset of the inner surface of the outer wall proximate the dosing structure, the overall cross-section through the adapter element, which is available for fluid to flow through, can be maintained as increasing linearly from the inlet to the outlet. Put another way, the extra cross-sectional area gained by outwardly offsetting the inner surface of the outer wall may equate to a cross-sectional area which would otherwise have been lost, due to being obscured, or blocked, by the presence of the dosing structure. Maintaining a linear area schedule is advantageous for maintaining a high efficiency across the turbine.

The inner surface of the outer wall may be offset by an annular recess which extends at least partly circumferentially around the outer wall.

The annular recess may extend at least partially circumferentially around the longitudinal axis. The annular recess may otherwise be described as a slight increase of the diameter of the inner surface. The annular recess may be provided at a longitudinal position which generally corresponds to a length of the dosing structure. Specifically, the annular recess may be provided at a longitudinal position which generally corresponds with a longitudinal extent, or length, of a base, or strut of the dosing structure. Put another way, the dosing structure may be described as being provided within the annular recess. The annular recess may otherwise be described as an annular gap, or offset.

The annular recess may extend entirely circumferentially around the outer wall. The annular recess may offset an inner surface of the inner and/or outer wall by between around 1 mm and around 5 mm, and more preferably around 3 mm.

Advantageously, and similar to that described above, the presence of the annular recess means that a linear area schedule can be maintained between the inlet and outlet of the diffuser. Furthermore, the annular recess is advantageous because the inner surface is offset in a circumferential manner. That is to say there may be no localised bulges or similar, so the flow is more evenly effected by the presence of the annular recess. This is desirable for reasons that flow disruptions, such as turbulent eddies, may be reduced or avoided altogether.

The adapter element may further comprise:
a) a diffuser attached to the inner surface of the outer wall, the diffuser comprising:
i) an inlet configured to receive fluid from the turbine;
ii) an outlet, in fluid communication with the inlet, configured to exhaust fluid from the turbine;
iii) an inner wall, which extends between the inlet and the outlet, defining an inner surface and an opposing outer surface;
iv) optionally wherein a portion of the inner surface of the inner wall is outwardly offset proximate the dosing structure.

The diffuser refers to a component which generally diverges in cross-section. The diffuser defines a longitudinal axis which may extend along a length of the diffuser. That longitudinal axis may extend between centre points of the inlet and outlet cross-sections of the diffuser. The longitudinal axis may also be the axis about which an upstream turbine wheel rotates. Fluid which is received from the turbine through the inlet of the diffuser may generally reduce in speed, along the length of the diffuser, as the cross-sectional area of the diffuser increases moving towards the outlet. At the same time, the static pressure of the flow may increase whilst the total pressure decreases.

The diffuser may be described as extending from the inner surface of the outer wall. The diffuser may be integrally formed with the outer wall. The diffuser being integrally formed with the outer wall is intended to mean that the diffuser and outer wall form a monolithic component. The diffuser and outer wall may therefore be described as being a unitary, and uniform, body. That is to say, there may be no join line between the two components. A separate process may not be required in order to connect the components. The components may be adjoined from inception. This may be achieved by an additive manufacture, or casting, process. The diffuser being attached to the inner surface of the outer wall may otherwise be described as the diffuser effectively being suspended, or supported within, the adapter element (and, for example, specifically the outer wall thereof). A further component, such as a strut, may interpose the diffuser and the outer wall so as to separate the two components. A gap may be provided between the inner and outer walls. The gap may define generally annular recess, or channel. The generally annular recess or channel may be a bypass channel or a cavity. The generally annular recess or channel may be a bypass channel where the adapter element is incorporated in a wastegated turbocharger. The generally annular recess or channel may be a cavity where the adapter element is incorporated in a non-wastegated turbocharger (e.g. a variable geometry turbocharger, or a fixed geometry turbocharger).

The inlet of the diffuser may be provided at one outer end of the diffuser. The outlet of the diffuser may be provided at an opposing outer end of the diffuser. The diffuser may be a generally frustoconical body. The inner wall may extend continuously between the inlet and the outlet. As such, the inner wall may define a closed internal geometry of the diffuser between the inlet and the outlet. The inner surface may refer to an interior of the inner wall, whilst the outer surface may refer to an exterior of the inner wall.

At least part of the dosing structure may be integrally formed with, and/or project from, the inner surface of the inner wall. At least part of the dosing structure being integrally formed with the inner surface of the inner wall is intended to mean that the dosing structure and inner wall form a monolithic structure. The at least part of the dosing structure and the inner surface of the inner wall may therefore be described as being a unitary, and uniform, body. The dosing structure may merge smoothly into the inner surface of the inner wall. The dosing structure and inner surface of the inner wall may be connected to one another from inception, or the first creation, of the components. No further processes may be required to attach the dosing structure to the inner surface of the inner wall. At least part of the dosing structure which is integrally formed with the inner wall may be a base, or strut, of the dosing structure. A further portion of the dosing structure may subsequently be connected to said strut or base.

The inner surface of the inner wall may be offset by an annular recess which extends at least partly circumferentially around the inner wall. The advantages and optional features described above, in connection with the annular recess being defined in the inner surface of the outer wall, apply equally to the annular recess formed in the inner wall. For example, advantageously, providing an outwardly offset inner surface of the inner wall means that a linear area schedule can be maintained across the diffuser despite the incorporation of the dosing structure. It will be appreciated that only a portion of the inner wall may be outwardly offset, only a portion of the outer wall may be outwardly offset, or portions of both the inner and outer wall may be outwardly offset. The portions may have the same longitudinal extent. The extent to which the portions are offset (e.g. radially) may be the same.

Advantageously, integrally forming at least part of the dosing structure with the inner surface of the inner wall of the diffuser reduces leakage of the reductant (and/or by-products of reductant) through, or past, the inner wall. This alleviates corrosion issues which can occur should the liquid reductant flow toward the turbine and, in certain circumstances, contact the cast turbine housing of the turbine. Some reductants, such as urea, can form corrosive acids, such as isocyanic acid and cyanuric acid in use, which can be detrimental to the robustness of the materials from which the turbine housing is made. Said circumstances in which the liquid reductant may contact the turbine housing include engine shutdown and, should the adapter component be provided in a vehicle engine, when the vehicle is travelling either uphill or downhill (such that the liquid reductant flows towards the turbine, along the inner wall, under gravity). It will be appreciated that the nature of the mounting of the turbine, relative to the engine, will affect whether uphill or downhill travel is problematic.

Also advantageously, by integrally forming part of the dosing structure with the inner wall, the inner surface of the inner wall, across which the fluid from the turbine flows in use, can be uninterrupted by components which may otherwise be required to connect the dosing structure to the inner wall. Such components include fasteners which, if otherwise present, could disrupt the flow and could lead to turbulent eddies and a reduction in efficiency.

The dosing structure may comprise:
a) a strut, proximate the outer wall; and
b) a dosing outlet pipe, which extends from the strut and defines a fluid outlet.

The strut may be proximate the inner wall, specifically the inner surface thereof. The strut may be described as a projection. The strut may extend from the inner surface of the inner wall. The strut may otherwise be described as a base. The strut may extend towards, up to, or past, the longitudinal axis. The strut may incorporate a channel, or conduit, such as a pipe, through which reductant flows.

The dosing outlet pipe may be a separate component to that of the strut. That is to say, the dosing outlet pipe may be attached to the strut in a subsequent manufacturing, or assembly, step. Alternatively, the dosing outlet pipe may be integrally formed with the strut, such that the entire dosing structure is integrally formed with the inner wall of the diffuser. The dosing outlet pipe may simply refer to a portion of the dosing structure which expels the reductant towards the turbine. The dosing outlet pipe may extend from an end of the strut.

The dosing outlet pipe may comprise an extension conduit, or nozzle portion. Said part may be separate to a portion of the dosing outlet pipe which is integral with the strut. The extension conduit or nozzle portion may be attached, or affixed, to the portion, by way of a screw thread or other attachment means. The fluid aperture, or fluid outlet, may be provided in the extension conduit or nozzle portion.

The strut may be a first portion of a pipe (e.g. an upright portion) and the dosing outlet pipe may be a second portion of the pipe (e.g. which is angled relative to the first portion of the pipe). In other words, the dosing structure may consist of a pipe, which may be angled.

The fluid outlet may simply be an aperture, e.g. a hole, in the dosing outlet pipe. Reductant may be expelled from the fluid outlet in liquid form or alternatively may be atomised e.g. a mist of particles.

Advantageously, providing a strut which offsets the dosing outlet pipe, and so fluid outlet, from the inner wall means that the reductant can be dosed more centrally relative to the longitudinal axis. This is advantageous in dosing the reductant towards a dosing cup, if the turbine wheel incorporates said cup. Dosing the reductant more centrally within the exhaust stream flow may also be advantageous in more evenly distributing the reductant into the flow.

The strut may comprise an aerodynamic profile.

The strut comprising an aerodynamic profile may mean that the strut is shaped like an aerofoil in cross-section. For example, the strut may resemble a vane e.g. having a leading edge and a trailing edge and an arcuate profile between the two.

Providing an aerodynamic profile as part of the strut is advantageous in reducing the pressure drop across the adapter element, and specifically the diffuser. Should the strut not comprise an aerodynamic profile, and instead be a block for example, the relatively bluff body may lead to the formation of turbulent eddies and lead to an increased pressure drop across the strut. These may result in an undesirable loss in efficiency.

An entirety of the strut may comprise an aerodynamic profile (e.g. an aerofoil or teardrop shape). That is to say, where the strut is shaped like an aerofoil, an entire height of the strut, e.g. in a radial direction, may be aerofoil shaped. Alternatively, only part of the strut may incorporate an aerodynamic profile (e.g. only a portion of a height of the strut may incorporate an aerodynamic profile).

The strut may projects towards, but not up to, the longitudinal axis defined by the adapter element, and the dosing outlet pipe may be angled towards the longitudinal axis.

The strut projecting towards the longitudinal axis is intended to mean that the strut extends in a direction which reduces a separation between a longitudinal axis and the strut. This may be in a generally radial direction towards the longitudinal axis. The strut projecting towards, but not up to, the longitudinal axis is intended to mean that the strut stops shy of the longitudinal axis. In other words, a radial extent of the strut is less than a radius of the diffuser at that longitudinal position.

The dosing outlet pipe being angled towards the longitudinal axis is intended to mean that the dosing outlet pipe is provided at an acute angle relative to the longitudinal axis. In other words, the dosing outlet pipe either cuts through the longitudinal axis, or would cut through the longitudinal axis if the dosing outlet pipe was extended. The dosing outlet pipe being angled towards the longitudinal axis may otherwise be described as the fluid outlet (of the dosing outlet pipe) being angled towards the dosing cup, or spray target.

Such an arrangement is advantageous in reducing a height of the strut. In turn, reducing a height of the strut reduces the drag/pressure drop across the dosing structure, which improves the efficiency of the turbine. The angled dosing outlet pipe improves 'run-back' of reductant liquid. This reduces the risk that reductant leaks out of the fluid aperture when not required. Reductant is, instead, more likely to travel back into the dosing outlet pipe, reducing the risk that said reductant leak (undesirably) into an interior of the diffuser.

The strut may project towards the longitudinal axis defined by the adapter element.

The strut may project up to the longitudinal axis. Alternatively, the strut may project towards, but not up to, the longitudinal axis.

The dosing outlet pipe may be aligned with the longitudinal axis. The dosing outlet pipe being aligned with the longitudinal axis is intended to mean that the dosing outlet pipe is effectively provided on the longitudinal axis. That is to say, a fluid outlet of the dosing outlet pipe generally points in a direction which corresponds with the longitudinal axis. As such, in use, reductant is expelled along the longitudinal axis. The reductant may be expelled into a turbine wheel dosing cup (if the turbine will incorporates such cup).

In other arrangements, the dosing outlet pipe may be parallel to the longitudinal axis, but be offset therefrom.

The dosing outlet pipe may be a generally tubular body e.g. generally cylindrical. However, it will be appreciated that the dosing outlet pipe may have any one of a range of a range of different shapes. For example, it may have an aerodynamic profile, be a star, cruciform or other shape. An end of the dosing outlet pipe, proximate the outlet of the adapter element (e.g. opposing the fluid aperture of the dosing outlet pipe), may be faired e.g. tapered, or filleted. This may depend upon the manufacture method.

The strut may project past the longitudinal axis, across a majority of a diameter of the diffuser, and wherein a gap may be provided between a radially outer end of the dosing structure and an adjacent region of the inner surface of the inner wall.

A strut projecting past the longitudinal axis, across the majority of the diameter of the diffuser, and still providing a gap between the radially outer end of the dosing structure and the inner surface of the inner wall may otherwise be described as the dosing structure extending across most, but not all, of the diffuser. Put another way, the dosing structure extends across the majority of the diffuser but does not contact an opposing surface of the diffuser. This is advantageous in reducing heat transfer away from the diffuser. In use, it is desirable that the diffuser is kept relatively hot so that the reductant operates efficiently and reduces emissions as desired. If the opposing end of the dosing structure was to also contact the inner surface of the inner wall, more heat would be transferred (by conduction) away from the diffuser, and the efficiency of the operation of the reductant would be reduced.

In arrangements where the dosing structure also provides a mixing effect e.g. where the dosing structure comprises an aerodynamic profile and/or a varying cross-section, it is advantageous that the dosing structure extends past the longitudinal axis and across a majority of the diameter of the diffuser. This is so that the dosing structure affects a greater proportion of the flow through the diffuser. In such instances, an effective balance between achieving a more thorough mixing effect, whilst reducing heat transferred away from the diffuser, is to have the dosing structure extend across a majority of the diameter but not contact the opposing inner surface of the inner wall.

The dosing structure may comprise a mixing element.

The dosing structure comprising a mixing element is intended to mean that the dosing structure provides a mixing effect. The mixing element may be an additional wing which extends from the strut in a generally diametric fashion, and which imparts a swirl to the flow, for example. Alternatively, the mixing element may refer to a non-constant cross-section of the strut. For example, the strut may have an aerodynamic profile e.g. aerofoil shaped, but the aerodynamic profile may transition along a radial extent of the strut. This may impart a mixing effect to the flow. The mixing element may be generally horizontal. A plurality of mixing elements may be incorporated, having a positive and negative geometry, to enhance the mixing of the flow. The plurality of mixing elements may be distributed around the longitudinal axis. The plurality of mixing elements may be provided as an array, or distribution. A pair of mixing elements may be provided in a diametrically opposing manner. The profile of the mixing element may vary with radius. For example, a trailing edge angle of the mixing elements may vary with radius. Any mixing element may be considered to form part of an extension of the strut.

One or more projections may extend from the outer surface of the inner wall.

The one or more projections that extend from the outer surface of the inner wall may extend to the inner surface of the outer wall. Alternatively, the one or more projections may extend toward, but not up to, inner surface of the outer wall.

The one or more projections may comprise any one of a number of different geometries e.g. circumferential, helical, radial etc. or a combination of one or more of these geometries. The one or more projections may provide any one of a number of different functions such as directing flow, supporting the diffuser and/or stabilising the flow.

Where the adapter element comprises a plurality of projections, the adapter element may be said to comprise an array of projections. Each of the projections may share a common geometry e.g. each of the projections may be the same type of projection but provided at a different position. Alternatively, the projections may differ in position and/or geometry and/or function.

The one or more projections may be integrally formed with the inner wall.

Advantageously, providing one or more projections which extend from an outer surface of the inner wall does not disrupt the interior of the diffuser. That is to say, the inner surface of the inner wall is not interrupted by the presence of the one or more projections, which could otherwise lead to a reduction in efficiency.

The one or more projections may extend, alternatively or in combination, from the inner surface of the outer wall.

The one or more projections may comprise one or more helical projections.

The one or more helical projections may be a vane. The one or more helical projections may be a swirl vane. The one or more helical projections may be a flow guide vane. The one or more helical projections may otherwise be described as projections which form a helical profile.

Helical projections is intended mean a projection that extends at least partway around the outer surface of the inner wall across a range of circumferential, and axial, positions. The helical projections may otherwise be described as corkscrew-like projections. The helical projections may otherwise be referred to as swirl vanes or flow guide vanes. The helical projections may extend across an entirety of the outer surface of the inner wall. Alternatively, the one or more helical projections may only extend across part, or a portion, of the outer surface of the inner wall.

Advantageously, the helical projections impart a swirling effect to the flow. This is particularly advantageous where the adapter element forms part of a turbine which incorporates a wastegate. Where the turbine incorporates a wastegate, which is used to divert exhaust gases around the turbine wheel, the exhaust gases are typically diverted through the wastegate and through a bypass channel which is defined between the inner wall and the outer wall of the adapter element. By providing a swirling effect to this relatively hot bypass flow, the exterior of the diffuser, and the diffuser more generally, is heated by convection. As previously mentioned, it is desirable to keep the diffuser temperature relatively high to ensure that the reductant operates effectively and that efficiency is maintained. Providing a swirl effect to the bypass flow, by virtue of incorporating one or more helical projections, facilitates this.

Also advantageously, the helical projections, or any projections for that matter, increase the surface area of the exterior of the diffuser. The diffuser is therefore heated more quickly, by convection, when incorporated in a wastegate turbine.

The adapter element may comprise one or more of a plurality of helical projections, which may be said to form an array of projections. The one or more helical projections may otherwise be described as vanes or fins.

The one or more projections may comprise one or more generally circumferential projections.

Generally circumferential projection refers to a projection which occupies a portion of a circumference around the longitudinal axis, but which may not exclusively be circumferential. That is to say, the generally circumferential projection may include some tapering or part of a helical geometry.

The generally circumferential projection may be referred to as a stabilisation vane. Advantageously, the stabilisation vane may be slightly angled such that, in arrangements where the bypass flow is swirled by swirl vanes, the swirl is largely neutralised by the stabilisation vanes. The flow may therefore exit the adapter element in a relatively linear manner. Put another way, where the swirl vanes impart a swirl to the flow, the stabilisation vanes may remove said swirl from the flow. This may be achieved by effectively swirling the flow but in the opposite direction to that of the swirl vanes, such that the flow exists the adapter element in a relatively linear manner (e.g. without swirl).

The one or more generally circumferential projections may extend between the inner wall and the outer wall. As such, the generally circumferential projections may also effectively be spokes, or struts, which support the diffuser within the adapter element. Alternatively, the one or more generally circumferential projections may extend to a mounting flange where the diffuser does not form part of an adapter element.

In some arrangements, the generally circumferential projections may be solid. Where the generally circumferential projections effectively block the flow (e.g. when they are solid), it is advantageous to incorporate an angle to the generally circumferential projection such that fluid flows along the projection, rather than impinging directly into it. Put another way, by providing at least part of the generally circumferential projection at an angle (e.g. an acute angle) relative to the general flow direction, and so offset from perpendicular to the longitudinal axis, the fluid is less likely to directly impinge the projection (which could lead to the formation of turbulent eddies and/or a reduction in efficiency).

A circumferential array of generally circumferential projections may be provided. Put another way, a plurality of generally circumferential projections may be provided in a circumferential distribution.

The outer surface of the inner wall may comprise a lattice.

Lattice refers to a structure formed of an array of thin rib-like walls and cavities. An example of a lattice includes a honeycomb structure. However, other geometries are also possible such as squares, rectangles, triangles, etc. The lattice may be described as a grid-like array of cavities defined between walls. The lattice may be described as an isogrid.

Advantageously, the lattice reduces the amount of material that is incorporated in the inner wall, owing to the presence of the cavities, and therefore gives rise to a weight saving benefit. Furthermore, the lattice is a relatively robust structure and the amount of material used can therefore be reduced without negatively impacting the robustness of the diffuser. Further advantageously, the lattice reduces heat transfer away from the diffuser, owing to the cavities providing an insulating effect, which could otherwise lead to a reduction of the temperature of the diffuser. For the reasons previously mentioned, it is desirable to maintain a relatively high temperature within/proximate the diffuser.

The lattice may occupy an entirety of the outer surface of the inner wall. Alternatively, the lattice may only be provided at a portion of the outer surface of the inner wall.

The adapter element may further comprise a reductant barrier.

The reductant barrier may otherwise be referred to as a blocking means or a blocking element. The reductant barrier may otherwise be referred to as a dam, or urea dam. The reductant barrier may define a blocking face, impermeable to the passage of liquids thereacross.

The reductant barrier may be aligned with a plane normal to the longitudinal axis. Alternatively, the reductant barrier may be angled, or inclined, relative to a plane normal to the longitudinal axis.

Advantageously, the reductant barrier reduces the risk of liquid reductant contacting the (cast) turbine housing, reducing the risk that the liquid reductant corrodes the turbine housing. The reductant barrier can be said to form a seal of sorts.

The reductant barrier may project from a portion of the inner surface of the outer wall.

The reductant barrier may be generally arcuate. The reductant barrier may be said to extend partly circumferentially. The reductant barrier may only extend from a portion of the circumference of the inner surface of the outer wall. The reductant barrier may be integrally formed with the diffuser and/or adapter element more generally.

In use, the reductant barrier is preferably provided at a bottom position, or lowermost position, of the inner surface of the outer wall. Put another way, the reductant barrier preferably occupies at least a 6 o'clock position. This is owing to the fact, in use, liquid reductant may collect, or gather, at the lowermost position under gravity. It is therefore desirable to block said reductant liquid from flowing along the inner wall, and potentially contacting the turbine housing, at this circumferential position.

Advantageously, where a reductant barrier projects from a portion of the inner surface of the outer wall, reductant liquid may be prevented from flowing along said inner surface of the outer wall towards the turbine housing. This, in turn, reduces the risk of the liquid reductant contacting a cast turbine housing, which may be liable to corrode due to the reductant.

The reductant barrier may extend between the inner surface of the outer wall and an adjacent portion of the outer surface of the inner wall.

The reductant barrier extending between the inner surface of the outer wall and the adjacent portion of the outer surface of the inner wall means that the reductant barrier effectively forms a spoke, or strut, which extends between the outer and inner walls. Put another way, the reductant barrier connects the inner and outer walls.

The reductant barrier which extends between the inner and outer walls may be a solid barrier e.g. the reductant barrier is solid across an entire radial extent between the inner and outer walls.

The diffuser may be attached to the inner surface of the outer wall by the reductant barrier.

The diffuser may only be attached to the inner surface of the outer wall by the reductant barrier. That is to say, the reductant barrier may be the sole means by which the diffuser is connected to the outer wall. Alternatively, the reductant barrier may be one of a number of different struts, or spokes, which connect the diffuser to the outer wall. The reductant barrier, and other struts or spokes, may be provided in a circumferentially distributed array around the longitudinal axis.

An end of the outer wall, distal the turbine, may define an adapter element outlet; and a) wherein the outlet of the diffuser may be axially recessed within the adapter element outlet.

The outlet of the diffuser being axially recessed within the adapter element outlet may otherwise be described as the outlet of the diffuser being axially recessed relative to the adapter element outlet. Put another way, the outlet of the diffuser may be described as being both radially, and axially, within the adapter element outlet. Put another way, the adapter element outlet effectively projects past the diffuser outlet.

Advantageously, by recessing the diffuser outlet within the outer wall, and specifically the adapter element outlet, the diffuser, primarily the diffuser outlet, is protected by the outer wall. That is to say, the inner wall of the diffuser, which may be relatively thin and could otherwise be liable to become damaged in use, is protected by the outer wall from external knocks, impacts and other damage.

According to a second aspect of the disclosure there is provide a diffuser for a turbine, the diffuser comprising:
a) an inlet having a first cross-sectional area and being configured to receive fluid;
b) an outlet, in fluid communication with the inlet, having a second cross-sectional area, the second cross-sectional area being larger than the first cross-sectional area, the outlet being spaced apart from the inlet; and
c) a wall, which extends between the inlet and the outlet, defining an inner surface and an opposing outer surface;
d) wherein the outer surface comprises a lattice.

Lattice refers to a structure formed of an array of thin rib-like walls and cavities. An example of a lattice includes a honeycomb structure. However, other geometries are also possible such as squares, rectangles, triangles, etc. The lattice may be described as a grid-like array of cavities defined between walls. The lattice may be described as an isogrid.

The lattice may occupy an entirety of the outer surface of the wall. Alternatively, the lattice may only be provided at a portion of the outer surface of the wall.

The diffuser refers to a component which generally diverges in cross-section. The diffuser defines a longitudinal axis which may extend along a length of the diffuser. That longitudinal axis may extend between centre points of the inlet and outlet cross-sections of the diffuser. The longitudinal axis may also be the axis about which an upstream turbine wheel rotates. Fluid which is received from the turbine through the inlet of the diffuser may generally reduce in speed, along the length of the diffuser, as the cross-sectional area of the diffuser increases moving towards the outlet. At the same time, the static pressure of the flow may increase.

The diffuser may be mounted within a turbine adapter element. The diffuser may be integrally formed with a turbine adapter element. The diffuser may be mounted within a turbine housing. The diffuser may comprise a mounting flange. The mounting flange may engage, or be configured to engage, a turbine housing.

The inlet of the diffuser may be provided at one outer end of the diffuser. The outlet of the diffuser may be provided at an opposing outer end of the diffuser. The diffuser may be a generally frustoconical body. The inner wall may extend continuously between the inlet and the outlet. As such, the wall may define a closed internal geometry of the diffuser between the inlet and the outlet. The inner surface may refer to an interior of the wall, whilst the outer surface may refer to an exterior of the wall. The outlet may be spaced apart from the inlet along a longitudinal axis.

Advantageously, the lattice reduces the amount of material that is incorporated in the wall, owing to the presence of the cavities, and therefore gives rise to a weight saving benefit. Furthermore, the lattice is a relatively robust structure and the amount of material used can therefore be reduced without negatively impacting the robustness of the diffuser. Further advantageously, the lattice reduces heat transfer away from the diffuser, owing to the cavities providing an insulating effect, which could otherwise lead to a reduction of the temperature of the diffuser. For the reasons previously mentioned, it is desirable to maintain a relatively high temperature within/proximate the diffuser.

The longitudinal axis may be defined by a length of the diffuser.

According to a third aspect of the disclosure there is provided a diffuser for a turbine, the diffuser comprising:
a) an inlet having a first cross-sectional area and being configured to receive fluid;
b) an outlet, in fluid communication with the inlet, having a second cross-sectional area, the second cross-sectional area being larger than the first cross-sectional area, the outlet being spaced apart from the inlet;
c) a wall, which extends between the inlet and the outlet, defining an inner surface and an opposing outer surface;
d) wherein one or more vanes extend from the outer surface.

One or more vanes extending from the outer surface refers to projections which influence flow. The one or more vanes may comprise swirl vanes and/or stabilisation vanes. The outlet may be spaced apart from the inlet along a longitudinal axis.

Advantageously, the one or more vanes influence the flow and provide a number of benefits, depending upon which variety of vane is incorporated.

Swirl vanes may be described as helical projections. Stabilisation vanes may be described as generally circumferential projections.

Helical projections is intended mean a projection that extends around the outer surface of the inner wall across a range of longitudinal positions. The helical projections may otherwise be described as corkscrew-like projections. The helical projections may extend across an entirety of the outer surface of the wall. Alternatively, the one or more helical projections may only extend across part, or a portion, of the outer surface of the wall.

Advantageously, the helical projections impart a swirling effect to the flow. This is particularly advantageous where the adapter element forms part of a turbine which incorporates a wastegate. Where the turbine incorporates a wastegate, which is used to divert exhaust gases around the turbine wheel, the exhaust gases are typically diverted through the wastegate and through a bypass channel which is defined between the inner wall and the outer wall of the adapter element. By providing a swirling effect to this relatively hot bypass flow, the exterior of the diffuser, and the diffuser more generally, is heated by convection. As previously mentioned, it is desirable to keep the diffuser temperature relatively high to ensure that the reductant operates effectively and that efficiency is maintained. Providing a swirl effect to the bypass flow, by virtue of incorporating one or more helical projections, facilitates this.

The diffuser may comprise a plurality of helical projections, which may be said to form an array of projections. The one or more helical projections may otherwise be described as fins.

Generally circumferential projection refers to a projection which occupies a portion of a circumference around the longitudinal axis, but which may not exclusively be circumferential. That is to say, the generally circumferential projection may include some tapering or part of a helical geometry.

Advantageously, the stabilisation vane may be slightly angled such that, in arrangements where the bypass flow is swirled by swirl vanes, the swirl is largely neutralised by the stabilisation vanes. The flow may therefore exit the adapter element in a relatively linear manner. Put another way, where the swirl vanes impart a swirl to the flow, the stabilisation vanes may remove said swirl from the flow. This may be achieved by effectively swirling the flow but in the opposite direction to that of the swirl vanes, such that the flow exists the adapter element in a relatively linear manner (e.g. without swirl).

The one or more generally circumferential projections may extend between the wall and an outer wall. As such, the generally circumferential projections may also effectively be spokes, or struts, which support the diffuser within another component (such as an adapter element). Alternatively, the one or more generally circumferential projections may extend to a mounting flange where the diffuser does not form part of an adapter element.

In some arrangements, the generally circumferential projections may be solid. Where the generally circumferential projections effectively block the flow (e.g. when they are solid), it is advantageous to incorporate an angle to the generally circumferential projection such that fluid flows along the projection, rather than impinging directly into it. Put another way, by providing at least part of the generally circumferential projection at an angle (e.g. an acute angle) relative to the general flow direction, and so offset from perpendicular to the longitudinal axis, the fluid is less likely to directly impinge the projection (which could lead to the formation of turbulent eddies and/or a reduction in efficiency).

A circumferential array of generally circumferential projections may be provided. Put another way, a plurality of generally circumferential projections may be provided in a circumferential distribution. By incorporating swirl vanes, which direct flow helically around an outer surface of the diffuser wall, the diffuser is heated more evenly, by convection, by a (bypass) exhaust flow. This reduces the risk that there are cold spots on the diffuser, in which the reductant may not perform as efficiently or effectively.

By incorporating stabilisation vanes, the flow may be de-swirled so as to provide a relatively linear flow downstream of the diffuser (even when the flow is swirled by swirl vanes). Stabilisation vanes are also advantageous in that they may be angled. Flow may therefore not directly impinge the vanes, but instead be guided along them. This advantageously reduces a pressure drop across the vanes, even when the vanes are used to suspend, or mount, the diffuser within an adapter element or turbine housing (for example).

The diffuser refers to a component which generally diverges in cross-section. The diffuser defines a longitudinal axis which may extend along a length of the diffuser. That longitudinal axis may extend between centre points of the inlet and outlet cross-sections of the diffuser. The longitudinal axis may also be the axis about which an upstream turbine wheel rotates. Fluid which is received from the turbine through the inlet of the diffuser may generally reduce in speed, along the length of the diffuser, as the cross-sectional area of the diffuser increases moving towards the outlet. At the same time, the static pressure of the flow may increase.

The diffuser may be mounted within a turbine adapter element. The diffuser may be integrally formed with a turbine adapter element. The diffuser may be mounted within a turbine housing. The diffuser may comprise a mounting flange. The mounting flange may engage, or be configured to engage, a turbine housing.

The inlet of the diffuser may be provided at one outer end of the diffuser. The outlet of the diffuser may be provided at an opposing outer end of the diffuser. The diffuser may be a generally frustoconical body. inner wall may extend continuously between the inlet and the outlet. As such, the wall may define a closed internal geometry of the diffuser between the inlet and the outlet. The inner surface may refer to an interior of the wall, whilst the outer surface may refer to an exterior of the wall.

The longitudinal axis may be defined by a length of the diffuser.

The diffuser may further comprise a mounting flange which is configured to engage a turbine housing of the turbine. The one or more vanes may extend between the wall and the mounting flange.

According to a fourth aspect of the disclosure there is provided a diffuser for a turbine, the diffuser comprising:
 a) an inlet having a first cross-sectional area and being configured to receive fluid;
 b) an outlet, in fluid communication with the inlet, having a second cross-sectional area, the second cross-sectional area being larger than the first cross-sectional area, the outlet being spaced apart from the inlet;
 c) a wall, which extends between the inlet and the outlet, defining an inner surface and an opposing outer surface; and wherein
 d) a portion of the inner surface of the wall is outwardly offset.

A portion of the inner surface of the wall being outwardly offset is intended to mean that there is a localised outward projection of the inner surface. This may be relative to an otherwise continuous geometry either side of the offset. The wall may be outwardly offset proximate a dosing structure, which is intended to mean that the inner surface is outwardly offset at a position along a longitudinal axis which generally corresponds to the location of the dosing structure. Specifically, the portion of the inner surface may extend longitudinally by around the same extent as at least a base, or strut, of the dosing structure (or another axially longest part of the dosing structure). The inner surface of the wall may be outwardly offset by outwardly offsetting the whole inner wall (i.e. both the inner and outer surfaces thereof) or by simply reducing a thickness of the inner wall (i.e. such that the outer surface is otherwise unchanged but a thickness of the wall is reduced).

Advantageously, providing an outwardly offset inner surface of the wall means that a linear area schedule can be maintained across the diffuser despite the presence of an obstruction to the flow, such as a dosing structure. Incorporation of the dosing structure invariably reduces a cross-sectional area that is available for fluid, from the turbine, to flow through. By providing the outward offset of the inner surface of the wall proximate the dosing structure, the overall cross-section through the diffuser, which is available for fluid to flow through, can be maintained as increasing linearly from the inlet to the outlet. Put another way, the extra cross-sectional area gained by outwardly offsetting the inner surface of the inner wall substantially equates to a cross-sectional area which would otherwise have been lost, due to being obscured, or blocked, by the presence of the dosing structure. Maintaining a linear area schedule across the diffuser is advantageous for maintaining a high efficiency across the turbine.

The inner surface of the wall may be offset by an annular recess which extends at least partly, and optionally entirely, circumferentially around the inner wall.

The annular recess extends around the longitudinal axis. The annular recess may otherwise be described as a slight increase of the diameter of the inner surface. The annular recess may be provided at a longitudinal position which generally corresponds to a length of the dosing structure. Specifically, the annular recess may be provided at a longitudinal position which generally corresponds with a longitudinal extent, or length, of a base, or strut of the dosing structure. Put another way, the dosing structure may be described as being provided within the annular recess. The annular recess may otherwise be described as an annular gap, or offset.

The annular recess may offset an inner surface of the inner wall by between around 1 mm and around 5 mm, and more preferably around 3 mm.

The annular recess is advantageous because the inner surface is offset in a circumferential manner. That is to say there may be no localised bulges or similar, so the flow is more evenly effected by the presence of the annular recess. This is desirable for reasons that flow disruptions, such as turbulent eddies, may be reduced or avoided altogether.

According to a fifth aspect of the disclosure there is provided a turbine assembly comprising:
 a) a turbine; and
 b) the adapter element according to the first aspect of the disclosure, or the diffuser according to any one of the second, third or fourth aspects of the disclosure.

The turbine may comprise a turbine wheel and a turbine housing. The turbine wheel may be generally enclosed by the turbine housing. The adapter element may engage the turbine housing. Specifically, the first connection portion of the adapter element may engage the turbine housing. For the case of a diffuser, a diffuser may engage the turbine housing. Alternatively, the diffuser may be provided within an adapter element.

The turbine may form part of a turbocharger. Alternatively, the turbine may be a power turbine.

According to a sixth aspect of the disclosure there is provided a turbocharger comprising:
 a) a compressor;
 b) a bearing housing; and
 c) the turbine assembly according to the fifth aspect of the disclosure, wherein the turbine and compressor are in power communication.

The turbocharger may be a fixed geometry turbocharger. The turbocharger may be a variable geometry turbocharger. The turbocharger may be a wastegate turbocharger.

The turbocharger may form part of an engine arrangement. The engine arrangement may be part of a vehicle, such as an automobile. The engine arrangement may have a static application, such as in a pump arrangement or in a generator.

The turbine may comprise a turbine wheel, the turbine wheel being supported on the same shaft as the compressor wheel. An exhaust gas flow may be used to drive the turbine wheel so as to drive rotation of the compressor wheel.

The compressor may be secured to the turbine via a bearing housing.

The downstream outlet of the compressor may be in fluid communication with an inlet manifold of an engine. The compressor may be used to provide a boost pressure to the engine. An engine comprising the turbocharger may provide improved performance over an engine without a turbocharger, owing to exhaust gas exhausted from the cylinders being used to drive the turbine wheel and so compressor wheel. In other words, otherwise wasted energy in the exhaust flow is used to pressurise air which is used in the combustion cycle.

A conduit forming part of an exhaust system of the engine may be connected downstream of the diffuser and/or adapter element.

According to a seventh aspect of the disclosure there is provided a turbine housing for a turbine, the turbine housing comprising:

a) an inlet configured to receive exhaust gas;
b) a wheel cavity configured to receive a turbine wheel;
c) an outlet in fluid communication with the inlet;
d) an outer wall extending at least partway between the inlet and the outlet; and
e) a dosing structure configured to receive, and expel, reductant;
f) wherein at least part of the dosing structure is integrally formed with, and projects from, the outer wall.

The outer wall may define an outlet portion of the turbine housing. The outer wall may define the outlet. The outer wall may define an inner surface and an outer surface. The outer surface of the outer wall may define an exterior surface of the turbine housing. The outlet portion may be generally tubular, or generally frustoconical. The dosing structure may be provided downstream of the wheel cavity. The dosing structure may be provided upstream of the outlet.

Where the turbine housing comprises a diffuser, the dosing structure may also be integrally formed with the diffuser. The dosing structure may project through the diffuser, or into an interior of the diffuser.

At least part of the dosing structure being integrally formed with the outer wall is intended to mean that the diffuser and outer wall form a monolithic component. The diffuser and outer wall may therefore be described as being a unitary, and uniform, body.

The dosing structure may project inwardly (i.e. towards a longitudinal axis). The dosing structure may be provided between the inlet and the outlet. The dosing structure may be provided within the turbine housing (i.e. bound by the inlet and the outlet, and an inner surface of the outer wall). The dosing structure may extend into an interior of the turbine housing. The dosing structure may be configured to expel reductant into an interior of the turbine housing.

The turbine housing may be described as a dosing turbine housing.

Advantageously, integrally forming the dosing structure with the turbine housing means that the risk of leakage of reductant, through a slot which may otherwise be needed, is reduced. Sealing is thus improved. Forming at least part of the dosing structure with the outer wall may also mean that the dosing structure can be provided closer to the turbine wheel, which may mean a length of the dosing outlet pipe can be reduced.

The turbine housing may further comprise:
a) a diffuser attached to the outer wall, the diffuser comprising:
i) an inlet configured to receive fluid from the turbine;
ii) an outlet, in fluid communication with the inlet, configured to exhaust fluid from the turbine; and
iii) an inner wall, which extends between the inlet and the outlet, defining an inner surface and an opposing outer surface.

The diffuser may be integrally formed with the outer wall. A portion of the dosing structure may extend between the inner and outer walls. At least part of the dosing structure may be integrally formed with the inner surface of the inner wall.

According to an eighth aspect of the disclosure there is provided a computer program comprising computer executable instructions that, when executed by a processor, cause the processor to control an additive manufacturing apparatus to manufacture an adapter element or diffuser, optionally according to any one of the first, second, third or fourth aspects of the disclosure, or the turbine housing according to any the seventh aspect of the disclosure.

The adapter element, or diffuser, may be in accordance with the above aspects of the disclosure, incorporating any optional features provided in connection with the above aspects.

According to a ninth aspect of the disclosure there is provided a method of manufacturing an adapter element, diffuser, or turbine housing according to the seventh aspect of the disclosure, via additive manufacturing, the method comprising:
a) obtaining an electronic file representing a geometry of the adapter element, diffuser or turbine housing; and
b) controlling an additive manufacturing apparatus to manufacture, over one or more additive manufacturing steps, the adapter element, diffuser, or turbine housing according to the geometry specified in the electronic file;
c) optionally wherein the adapter element, or diffuser, is according to the first, second, third or fourth aspects of the disclosure.

The adapter element, or diffuser, may be in accordance with the above aspects of the disclosure, incorporating any optional features provided in connection with the above aspects.

The optional and/or preferred features for each aspect of the disclosure set out herein are also applicable to any other aspects of the disclosure.

BRIEF DESCRIPTION OF THE DRAWINGS

Specific embodiments of the present disclosure will now be described, by way of example only, with reference to the accompanying drawings in which:

FIG. 6a is a cutaway side view of an adapter element, in isolation, according to another embodiment;

FIG. 6b is an end view of the adapter element shown in FIG. 6a;

FIG. 7a is a schematic side view of part of an adapter element according to another embodiment;

FIG. 7b is a top-down view of a profile of a strut of FIG. 7a;

FIG. 7c is a schematic end view of the part of an adapter element shown in FIG. 7a;

DETAILED DESCRIPTION

Figure 1:
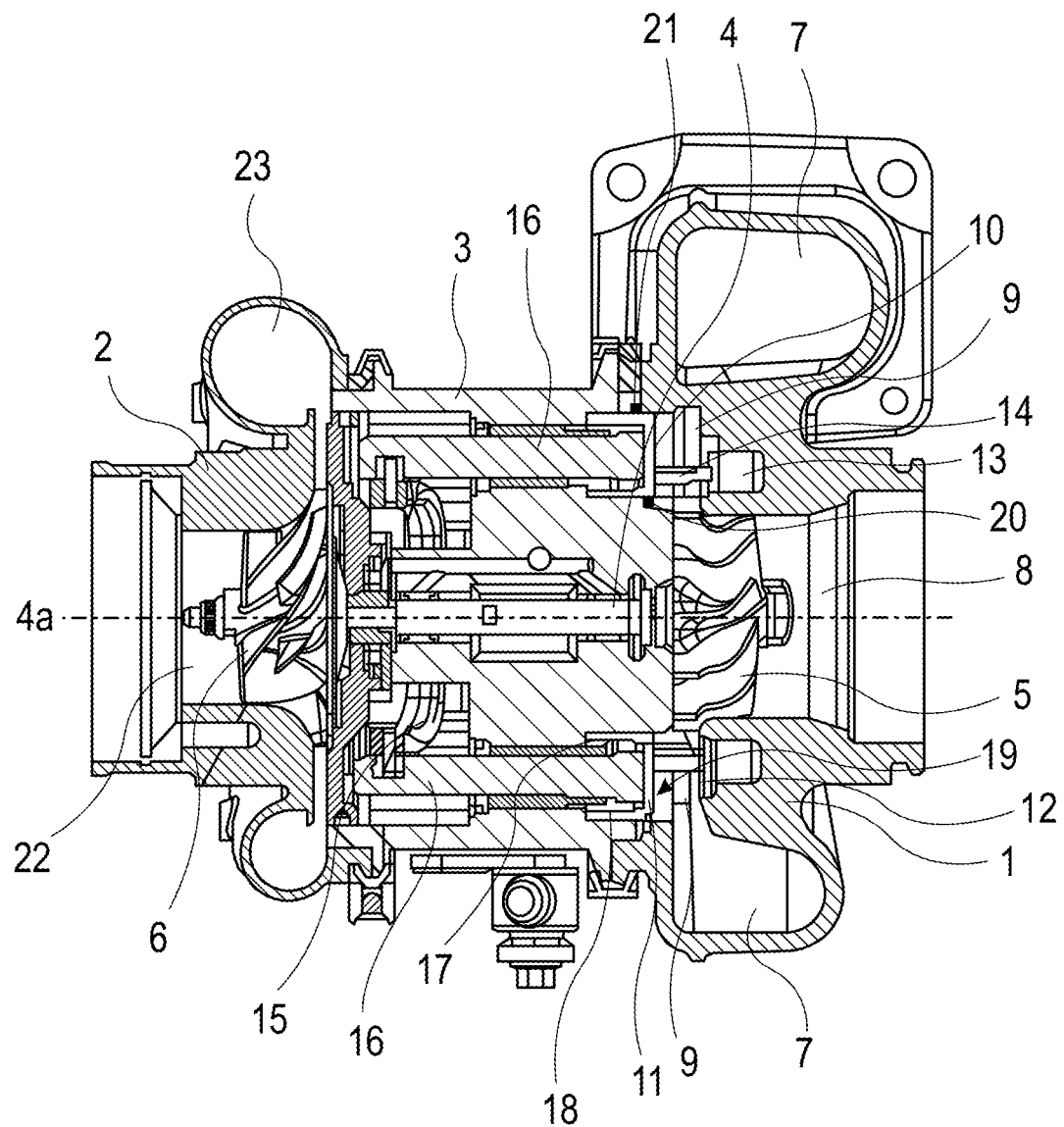
FIG. 1 is a side cross-section view of a known variable geometry turbocharger.

FIG. 1 is a side cross-section view of a known variable geometry turbocharger. The turbocharger comprises a (variable geometry) turbine housing 1 and a compressor housing 2 interconnected by a central bearing housing 3. A shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The turbine wheel 5 and compressor wheel 6 are therefore in power communication with one another. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled.

The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

The focus of the present application is the incorporation of a diffuser downstream of the turbine wheel. This will be described and illustrated in connection with FIG. 3 onwards.

Figure 2:
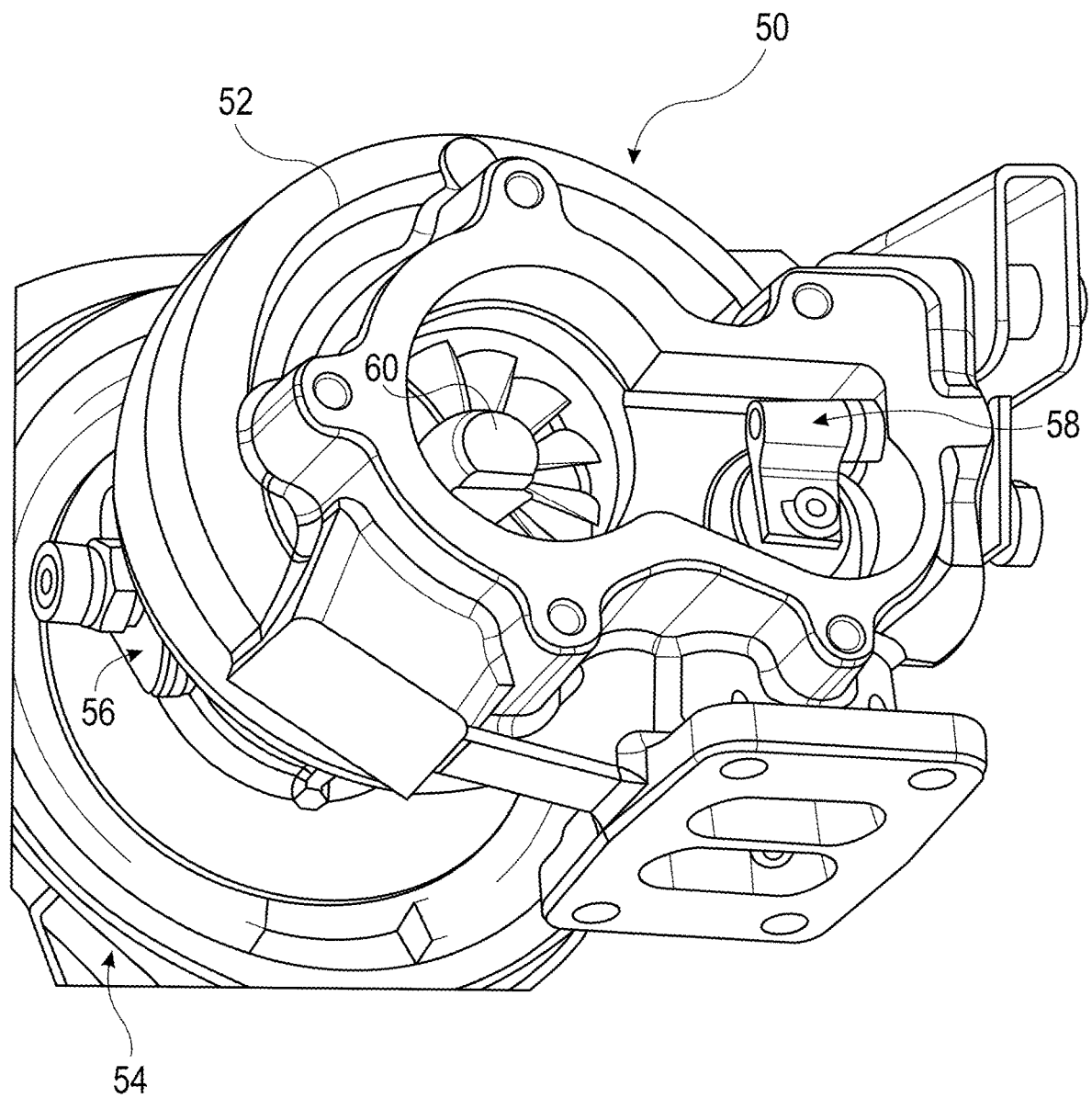
FIG. 2 is a perspective view of part of an alternative known turbocharger that incorporates a wastegate.

Turning to FIG. 2, a perspective view of an alternative known turbocharger is provided.

Like that described in connection with FIG. 1, the turbocharger of FIG. 2 comprises a turbine 50 which comprises a turbine housing 52. The turbocharger further comprises a compressor 54 and bearing housing 56 (only part of which are visible in FIG. 2). A primary difference between the known FIG. 1 and FIG. 2 arrangements is that the turbine 50, shown in FIG. 2, incorporates a wastegate 58. In use, the wastegate 58 is actuated so as to divert exhaust gas around the turbine wheel 60 and thereby adjust the mass flow rate of exhaust gas which is expanded across the turbine wheel 60. This, in turn, facilitates the control of the speed (e.g. RPM) of the turbine wheel 60.

When the wastegate 58 is at least partially actuated, so as to open a flow diverting channel, the overall exhaust gas flow is divided into two exhaust streams. A first stream is an exhaust stream which is expanded across the turbine wheel 60. A second stream is that of a bypass flow which has passed through the wastegate 58 (having been diverted around the turbine wheel 60).

Figure 3:
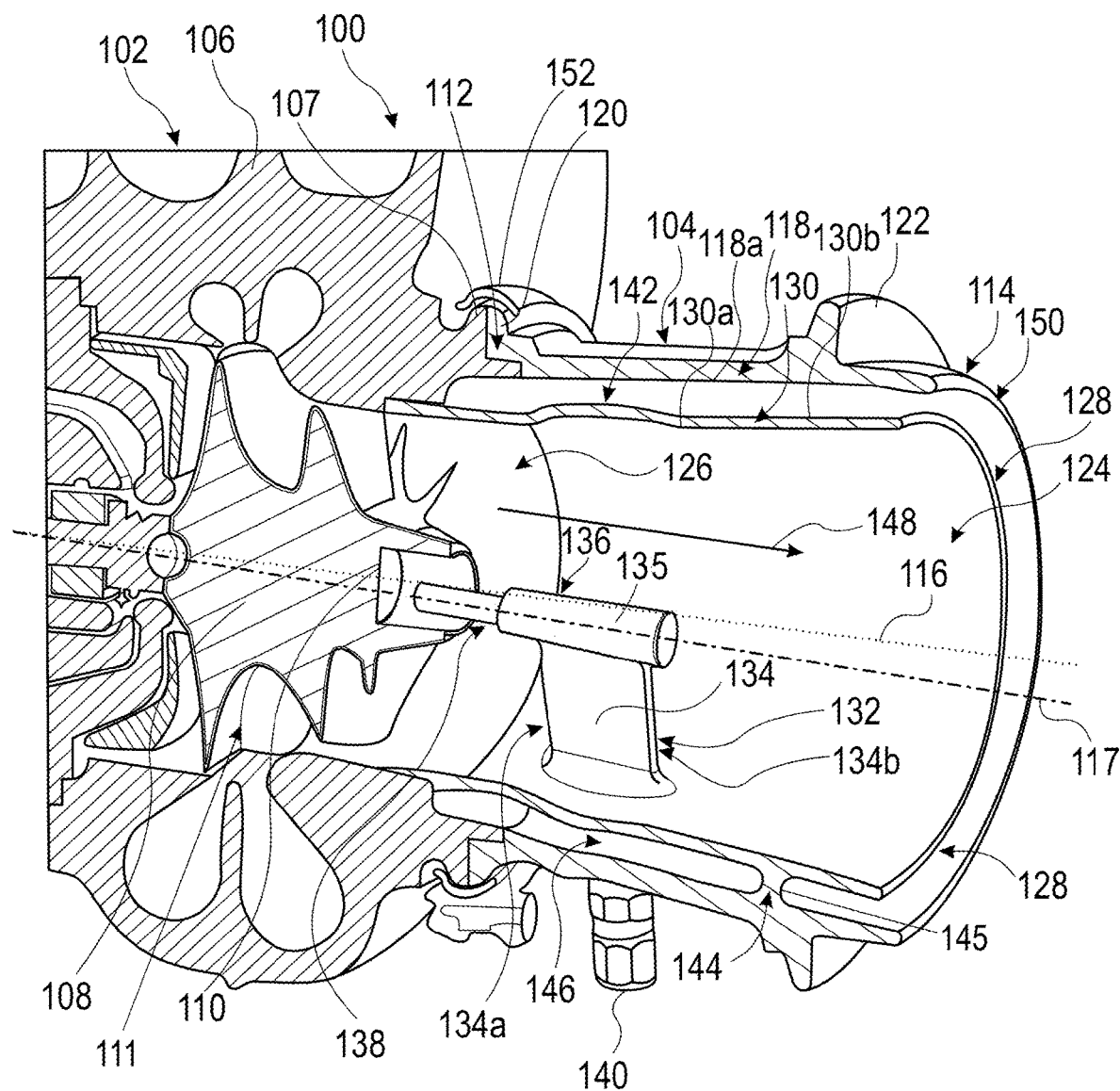
FIG. 3 is a perspective cutaway view of a turbine assembly, including an adapter element, according to an embodiment of the disclosure.

FIG. 3 is a cutaway perspective view of part of a turbine assembly 100 in accordance with an embodiment of the disclosure. The turbine assembly 100 comprises a turbine 102 and an adapter element 104.

The turbine 102 comprises turbine housing 106 and turbine wheel 108. Turbine wheel 108 also comprises a dosing cup 110 in the illustrated arrangement. The turbine housing 106 comprises a wheel cavity 111, which is configured to receive the turbine wheel 108.

Considering the adapter element 104 in detail, the adapter element comprises a first end 112 and a second end 114. The adapter element 104 extends along a longitudinal axis 116. The longitudinal axis 116 is also the axis about which the turbine wheel 108 rotates. However, in other embodiments this may not be the case. An outer wall 118 extends between the first and second ends 112, 114. In the illustrated arrangement, first and second connection portions 120, 122 are provided proximate the first and second ends 112, 114. The outer wall 118 therefore also extends between the first and second connection portions 120, 122. The first and second connection portions 120, 122 take the form of flanges which engage adjacent components. The first connection portion 120 engages the turbine housing 106. The second connection portion 122 engages a conduit (not shown) through which exhaust gas flows having been expanded across the turbine wheel 108.

The adapter element 104 further comprises a diffuser 124. The diffuser 124 is generally frustoconical in that it generally diverges, in cross section, moving away from the turbine wheel 108 along the longitudinal axis 116. The diffuser 124 is integrally formed with the outer wall 118, such that the outer wall 118 and the diffuser 124 are a single body. Put another way, there may be no join line between the diffuser 124 and outer wall 118. Specifically, the diffuser 124 is integrally formed with an inner surface 118a of the outer wall 118.

The diffuser comprises an inlet 126 which is configured to receive fluid from the turbine 106. In the illustrated embodiment the inlet 126 takes the form of a generally circular aperture. Fluid which has been expanded across the turbine wheel 108 flows through the diffuser 124 via the inlet 126. The inlet 126 may be provided proximate the first end 112 of the adapter element 104. The inlet 126 may also be considered to be an inlet of the adapter element 104 generally. The inlet 126 defines a first cross-sectional area.

At an end of the diffuser 124 distal the turbine 106, an outlet 128 is provided. The outlet 128 may be said to be provided proximate the second end 114 of the adapter element 104. Exhaust gas which flows into the inlet 126 of the diffuser 124 exits the diffuser 124 via the outlet 128. The outlet 128 defines a second cross-sectional area. The second cross-sectional area is greater than the first cross-sectional area.

The diffuser 124 further comprises a wall 130, which may be referred to as an inner wall 130, which extends between the inlet 126 and the outlet 128. The inner wall 130 defines an inner surface 130a and an outer surface 130b. The inner surface 130b is the surface proximate the fluid stream downstream of the turbine wheel 108, and the outer surface 130b is the surface proximate the outer wall 118.

The diffuser 124 further comprises a dosing structure 132. The dosing structure 132 is configured to receive, and expel, reductant. For the purposes of this document, reductant may include, for example, diesel exhaust fluid (DEF) such as urea. The reductant may therefore be liquid. The reductant facilitates Selective Catalytic Reduction (SCR) in which harmful NOx emissions are broken down into less reactive compounds.

The dosing structure 132 may be said to inject reductant, in a liquid form, into the exhaust stream downstream of the turbine wheel 108. Put another way, reductant is injected into an exhaust gas flow which has been expanded across the turbine wheel 108. Specifically, the dosing structure 132 may direct a flow of liquid reductant towards the dosing cup 110 in the turbine wheel 108. In use, when the turbine wheel 108 rotates, the dosing cup 110 may effectively atomise the liquid reductant which is then distributed axially and radially outwardly into the exhaust stream. The dosing of reductant downstream of the turbine 106 is advantageous because this is a point in the system upstream of where the SCR catalysts are located.

Whilst it is known to dose reductant into a dosing cup formed in a turbine wheel, there are a number of issues with existing solutions. For example, in existing solutions a pipe may be inserted through an aperture in the turbine housing and/or diffuser. However, because of the need for the pipe to be generally angled towards the turbine wheel (e.g. L-shaped), the aperture is generally elongate. Issues can be encountered when, in some circumstances, the liquid reductant flows through the slot, on the outside of the pipe, and contacts the cast metal turbine housing. This is at least because some liquid reductant, such as urea, can form by-products in use, which can be corrosive to turbine housings. Such by-products include, for example, isocyanic acid and cyanuric acid. Cast metal turbine housings, for example, may be particularly susceptible to corrosion from such by-products, but turbine housings manufactured using other processes, and from other materials, may be similarly susceptible. The cast metal turbine housings, recited throughout this document, may be cast iron turbine housings. Turbine housings may also be comparatively expensive components, and corrosion prevention or reduction is therefore also desirable for cost reasons.

The dosing structure 132 illustrated in FIG. 3 is integrally formed with at least the inner surface 130a of the inner wall 130. As such, the dosing structure 134 can be said to be integrally formed with the diffuser 124 (and the adapter element 104, more generally). Advantageously, the integrally formed nature of the dosing structure 132 and the inner wall 130 means that reductant, and/or associated by-products, is prevented from leaking through/past the inner wall 130 (of the diffuser 124) and contacting the cast metal turbine housing 106.

In the illustrated arrangement the dosing structure 132 comprises a strut 134 and a dosing outlet pipe 136. The strut 134 and dosing outlet pipe 136 may otherwise be described as first and second portions of the dosing structure 132. The strut 134 is proximate the inner wall 130 of the diffuser 124. The dosing outlet pipe 136 extends from the strut 134. In the illustrated embodiment, the dosing outlet pipe 136 further comprises a nozzle portion 138. The nozzle portion 138 may otherwise be described as an outlet portion, or an extension conduit. The nozzle portion 138 may be a separate component which is affixed, or attached, to a portion 135 of the dosing outlet pipe 136 which is integral with the strut 134 during assembly. Alternatively, the nozzle portion 138 may, in some embodiments, be integral with the portion 135 (e.g. such that the dosing outlet pipe 136 is a single, unitary component). Although not visible in FIG. 3, the dosing outlet pipe 136, specifically the nozzle portion 138 thereof, defines a fluid outlet, in the form of an aperture, through which the reductant is expelled toward the turbine wheel 108. Said aperture is visible in FIG. 4a, and labelled 139. In use, a stream of reductant (not shown in FIG. 3) is expelled from the dosing structure 132 and impinges the dosing cup 110. The reductant stream is then atomised into the exhaust stream 148. The nozzle portion 138 advantageously projects into the dosing cup 110. The nozzle portion 138 may be omitted in other embodiments, and the portion 135 of the dosing outlet pipe 136 which is integral with the strut 134 may define the fluid outlet.

In FIG. 3 the strut 134 extends towards the longitudinal axis 116 and the dosing outlet pipe 136 is inclined relative to the longitudinal axis 116. As such, the reductant is directed towards the turbine wheel 108, and specifically the dosing cup 110 thereof, at an angle relative to the longitudinal axis 116. An inclined arrangement advantageously reduces the height of the strut 134, which is desirable for aerodynamic efficiency reasons. However, and as will be described in connection with further embodiments, a variety of different embodiments of dosing structure 132 are possible, including arrangements in which the dosing outlet pipe 136 is collinear with the longitudinal axis 116.

Although not illustrated in FIG. 3, the dosing structure 132 receives reductant from an external reductant source, such as a tank. The reductant may be pumped from the external source through the dosing structure 132. Alternatively, the reductant may be fed under gravity, depending upon the orientation of the dosing structure 132.

Although not visible in FIG. 3, a portion of the dosing structure 132 may also extend past the inner wall 130 and through the outer wall 118. In some embodiments, the dosing structure 132 may also be integrally formed with the outer wall 118. Advantageously, where the dosing structure 132 is integrally formed with the outer wall 118, an internal conduit of the dosing structure 132 may be externally exposed. This can provide a readily accessible connection point for connecting the dosing structure 132 to the reductant source (not shown in FIG. 3). In the FIG. 3 embodiment, the dosing structure 132 is connected to the reductant source via a fixture 140. It will be appreciated that a variety of different fixtures may be used. Advantageously, incorporation of the dosing structure 132 also means the fixture 140 is easily externally accessible, for connection of the fixture 140 to a reductant source (e.g. via a conduit).

Returning to the dosing structure 132, in the illustrated arrangement the strut 134 comprises an aerodynamic profile. In this instance, the strut 134 is shaped like an aerofoil in that it has a leading edge 134a, a trailing edge 134b and surfaces which extend between the two. The aerodynamic profile advantageously reduces the pressure drop across the dosing structure 132 and reduces any effect the presence of the dosing structure 132 has on the efficiency of the overall turbine assembly 100.

The dosing outlet pipe 136 is barrel-shaped, or generally cylindrical, in the illustrated embodiment.

Returning to the diffuser 124, the diffuser 124, specifically an inner surface 130a of the inner wall 130 thereof, is outwardly offset proximate the dosing structure 132. That is to say, the inner wall 130 bulges outwards along a portion of the longitudinal axis 116 which the dosing structure 132 extends along. In the illustrated arrangement, the inner surface 130a is generally offset by an annular recess 142. The annular recess 142 can otherwise be described as a vacant band of material, or a band-shaped recess. Advantageously, the presence of the annular recess 142 effectively counteracts, or balances, a cross-sectional area, through the diffuser 124, which is taken up, or obscured, by the dosing structure 132. This means that a linear area schedule can be maintained between the inlet 126 and the outlet 128 of the diffuser 124, despite the dosing structure 132 obscuring a portion of the cross sectional area available for fluid to flow through. Linear area schedule is intended to mean that a cross-sectional area of the diffuser 124 increases linearly between the inlet 126 and the outlet 128. In other embodiments, the diffuser 124 may be omitted, and the annular recess may be provided in the outer wall 118 instead. In further embodiments, an annular recess may be provided in both the inner and outer walls 130, 118 (e.g. in inner surfaces 130a, 118a thereof).

As previously mentioned, the diffuser 124 is integrally formed with the outer wall 118. As such, the adapter element 104 is a single, unitary body. In the illustrated arrangement, the diffuser 124 is effectively suspended, or supported within, the outer wall 118. This is achieved by plurality of projections which extend from the inner wall 130 (of the diffuser 124) to the outer wall 118. Only one such projection is visible in FIG. 3, labelled 144, but two other projections (154, 156) are visible in FIG. 4a (and will be described in detail later in this document in connection with FIG. 4a).

Returning to FIG. 3, the projection 144 is also a reductant barrier. The reductant barrier is a blocking means, or a blocking element, which reduces the risk of liquid reductant from contacting the turbine housing 106. As such, a blocking face 145, defined by the reductant barrier 144, which is impermeable to the passage of liquids, effectively spans the entire reductant barrier 144. The risk of liquid reductant contacting the cast metal turbine housing 106 is greater when the adapter element 104 forms part of an engine in a vehicle which is moving uphill or downhill (depending upon the orientation of mounting). The risk is also greater when the diffuser 124 is operating at too low a temperature. When the temperature of the diffuser 124 is not high enough, atomised reductant in the exhaust stream may condense on the inner wall 130. Said condensed reductant may collect at a lowest point of the diffuser 124, and could then flow along the inner wall 130 and (undesirably) contact the turbine housing 106.

The presence of the projection 144 reduces the risk that any reductant, in liquid form, which collects in the exhaust system, flows along the outer wall 118 and contacts the turbine housing 106. The projection 144 thus reduces the risk that condensed reductant and/or by-products enters the turbine in certain orientations.

In the illustrated arrangement the projection 144 is a solid projection (i.e. it does not incorporate any cavities or recesses). The projection 144 extends between the inner surface 118a of the outer wall 118 and the outer surface 130b of the inner wall 130. The projection 144 projects from a portion of a circumference of the inner surface 118a of the outer wall 118. The projection 144 may be described as arcuate. In other arrangements, the projection 144, providing a reductant barrier functionality, may not be solid proximate the outer surface 130b of the inner wall 130. However, in order to provide the reductant barrier functionality, the projection 144 may be solid proximate a radially outermost point, where it adjoins the adjacent surface. The projection 144 advantageously reduces the risk of reductant and/or by-products condensing proximate a 'cold spot' between the inner and outer walls 118, 130. A cold spot may exist, at least temporarily, where a 'heat sink' body (e.g. a strut) is in thermal communication with the inner wall 118.

In the FIG. 3 orientation, liquid reductant would be liable to collect at a lowermost position within the adapter element 104. It is therefore advantageous to incorporate the projection 144, providing a reductant barrier functionality, at the circumferential position where reductant liquid is most likely to collect. However, this may be different for different arrangements and orientations.

Due to the projection 144 extending between the inner wall 130 and the outer wall 118, the projection 144 also provides a spoke, or strut, functionality.

The projection 144 is recessed relative to the second end 114 of the adapter element 104 to aid manufacture (and specifically moulding and/or casting feed).

A gap is provided between the inner and outer walls 130, 118. The gap is of the form of a generally annular recess 146. As suggested, the annular recess 146 extends around the longitudinal axis 116. In the illustrated embodiment, the turbine 102 is a fixed geometry turbine. As such, the turbine 102 does not incorporate a wastegate. Unlike the prior art arrangement in FIG. 2, where there is a wastegate 58 and a bypass flow which joins a main exhaust flow, the FIG. 3 arrangement would, in use, direct a single exhaust stream, generally labelled 148, which flows across, or through, the turbine 102. Because all of the exhaust gas flows through the diffuser 124 (i.e. as bound within the inner wall 130), the annular recess 146 does not define an active flow path per se. That is to say, no exhaust gas is actively routed through the annular recess 146. Instead, the annular recess 146 defines an air cavity, or air gap, which forms an insulating jacket around the diffuser 124. This is advantageous in maintaining a relatively higher temperature of the diffuser 124, by reducing the amount of heat which is transferred away from the diffuser 124. However, it will be appreciated that in other arrangements, and as will be described in connection with FIGS. 8a-c, an annular recess could instead define a bypass channel where the turbine in question incorporates a wastegate. The annular recess 146 is preferably at least around 5 mm, more preferably at least around 6 mm, on radius, to facilitate manufacture.

The inner wall 130 of the diffuser 124 is relatively thin. The inner wall 130 may be of the order of around 3 mm in thickness. Advantageously, the outlet 128 of the diffuser 124 is recessed axially within an adapter element outlet 150 provided at the second end 114 of the adapter element 104 (distal the turbine 102). The outer wall 118 therefore provides a shielding functionality to the diffuser 124 proximate the second end 114 of the adapter element. This is advantageous where the inner wall 130 of the diffuser 124 is relatively thin (and may therefore be fragile).

For completeness, in the illustrated arrangement the adapter element 104 engages the turbine 102 (specifically the turbine housing 106 thereof) and is secured thereto by a band clamp 152 (such as a Marman clamp). The band clamp 152 draws the first connection portion 120 (a flange in this arrangement) of the adapter element 104 towards, and into engagement with, a corresponding flange 107 of the turbine housing 106. The flanges are thereby brought into abutment with one another to secure the adapter element 104 to the turbine housing 106. A like attachment means e.g. a band clamp may be used to secure the second connection portion 122 of the adapter element 104 to a downstream conduit (not shown in FIG. 3).

The adapter element 104 provides a number of different advantages. These include reducing the risk of corrosion of the cast metal turbine housing 106 due to exposure to liquid reductant form the dosing structure 132, and also improving the adaptability of the turbine housing 106 for use in different applications. Specifically, by being able to modify the adapter element 104, a single variety of turbine housing 106 can be used for a range of different customer applications. For example, customers may have different ways they need to connect the dosing structure 132 to the reductant source, or have different means by which the second connection portion 122 of the adapter element 104 is to be connected to a downstream conduit. By modifying the adapter element 104, rather than customizing the entire turbine housing 106, customer requirements can be more readily met in a more straightforward manner.

It is envisaged that the adapter element 104 be produced by a casting (e.g. investment casting) or additive manufacture (e.g. 3D printing, such as binder jetting) process. Such processes provide greater flexibility in terms of the geometries of features that can be incorporated in the adapter element 104.

Although the outer surface 130b of the inner wall 130 has a smooth, solid surface, in other arrangements the inner wall 130 may comprise a lattice. Specifically, an outer surface 130b of the inner wall 130 may comprise a lattice. Lattice is intended to mean a structure, such as a honeycomb structure, which is formed of walls and cavities. Many different shapes are possible, including, but not limited to, triangles, squares, rectangles, pentagons etc. The aforementioned shapes generally refer to the cavities, with those shapes being defined by surrounding walls. The walls may otherwise be described as ribs. Advantageously, the presence of the cavities reduces the extent to which heat is conducted through the inner wall 130. The diffuser 124 is therefore kept at a higher temperature as a result. The presence of the cavities also means that less material is used in manufacturing the inner wall 130, which results in an associated weight saving. The lattice provides a lightweight and stiff structure, with a relatively low thermal conductivity factor. The incorporation of a lattice can therefore provide a lightweight, and robust, structure whilst reducing heat transferred away from the diffuser in use by conduction.

The lattice is preferably incorporated in arrangements which include a turbine which is fixed geometry, or variable geometry, but which do not incorporate a wastegate. This is because, for a wastegated turbocharger, the annular recess 146 would extend between the inner and outer walls 130, 118 and define a bypass flow channel. It is advantageous that the surrounding surfaces, which define the bypass channel, are relatively smooth (i.e. they do not incorporate a lattice) such that flow is not interrupted as it passes through the bypass channel. With that said, the lattice may be incorporated where the adapter element is to be used in a wastegate turbocharger. Furthermore, it may be the case that a lattice could be incorporated and then covered with a smooth layer e.g. that a lattice is sandwiched between inner and outer surfaces of the inner wall which are smooth. Similar benefits may be obtained in that weight savings may be made whilst still providing a robust diffuser with a relatively low thermal conductivity constant.

In other embodiments, the outer wall 118 of the adapter element 104 may be integral with the turbine housing 106. That is to say, the band clamp 152 may be omitted because the outer wall 118 extends from the turbine housing 106. All other features of the adapter element 104, as described above, are equally applicable to an embodiment whereby the outer wall 118, and adapter element 104 more generally, are integrated with, and form part of, the turbine housing 106. Said features include the integral diffuser 104, dosing structure 136 and reductant barrier 144.

Figure 4A:
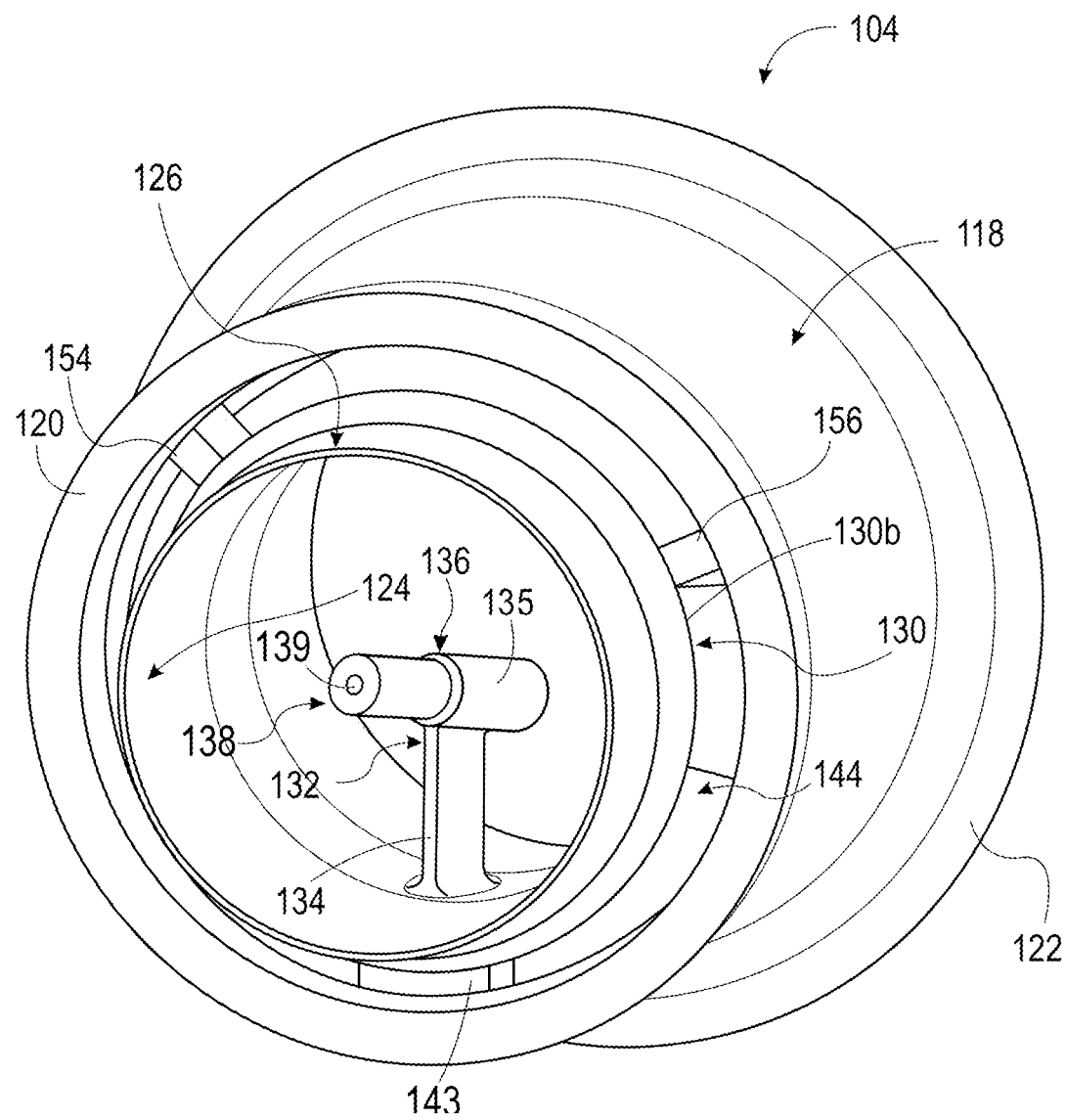
FIG. 4a is a perspective view of the adapter element of FIG. 3 in isolation.
Figure 4B:
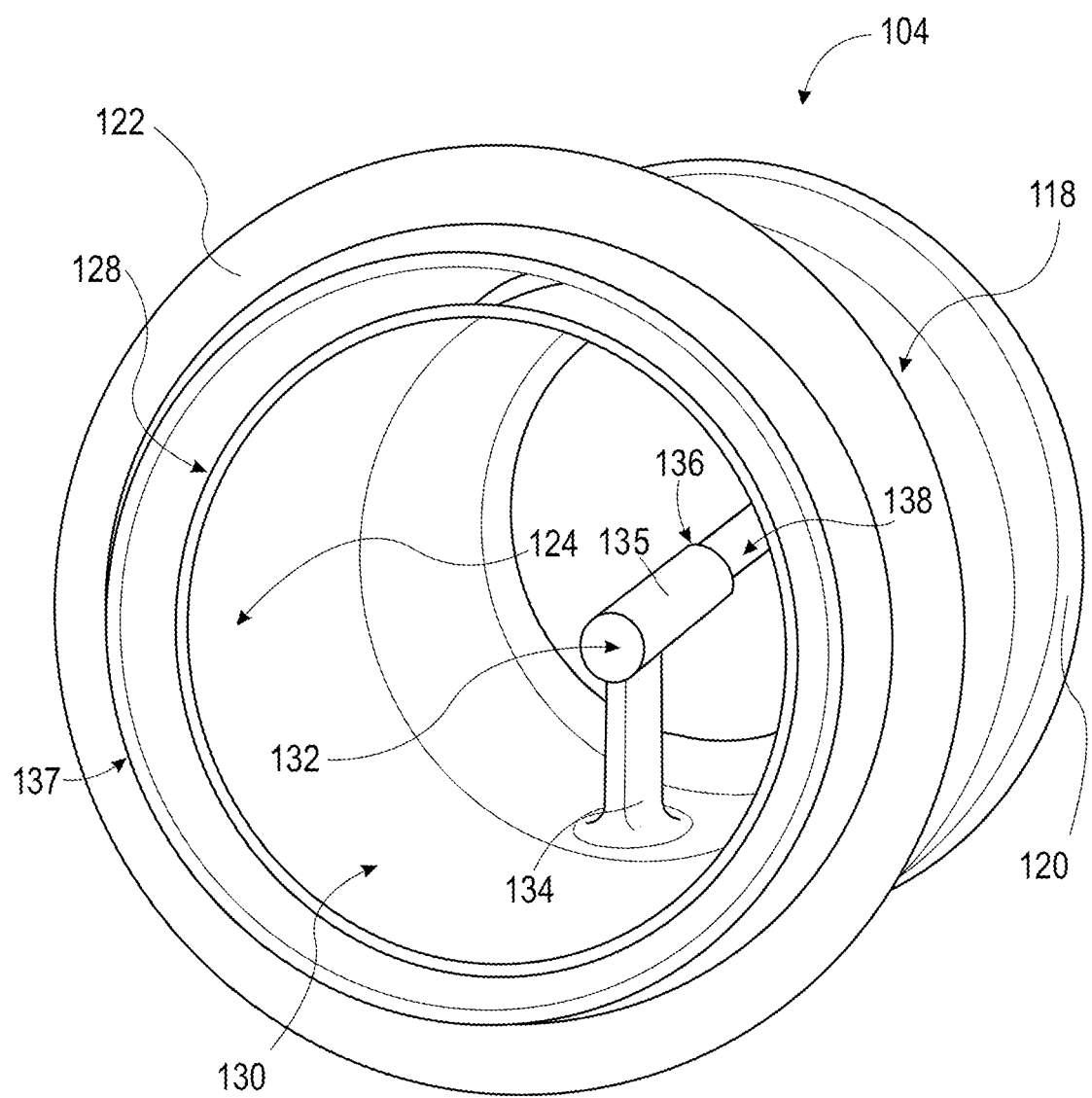
FIG. 4b is another perspective view of the adapter element in isolation.

Turning to FIGS. 4a and 4b, the adapter element 104, of FIG. 3, is shown in isolation. FIG. 4a is a perspective view of the adapter element 104 from an inlet 126 end of the diffuser 124. FIG. 4b is a perspective view of the adapter element 104 from an outlet 128 end of the diffuser 124.

In FIG. 4a, struts 154, 156, which are not visible in FIG. 3, are visible. The struts 154, 156 are examples of projections which extend from an outer surface 130a of the inner wall 130. The struts 154, 156, in combination with the projection 144, or reductant barrier, support the diffuser 124 within the outer wall 118. Struts 154,156 and projection 144 are circumferentially distributed about the longitudinal axis (which is omitted from FIGS. 4a and 4b for clarity). It will be appreciated that, in other arrangements, the number and/or distribution of projections may be varied. The struts 154, 156 may be shaped to guide bypass flow where the adapter element 104 forms part of a wastegate turbocharger (for example). In other embodiments, struts 154, 156 may be omitted such that the projection 144 is the sole means by which the inner wall 130 is supported within the outer wall 118. FIG. 4a also shows a portion 143 of the dosing structure 136 which extends between the inner and outer walls 130, 118. In use, reductant may flow through the portion 143, the strut 134 and dosing outlet pipe 136. The portion 143 may therefore be considered to be part of the strut 134, and may be referred to as a connecting, or extension, portion. The nozzle portion 138, of the dosing outlet pipe 136, and the fluid aperture 139 are also visible in FIG. 4. The portion 135 of the dosing outlet pipe 136, which is integral with the strut 134, is also illustrated.

FIGS. 4a and 4b illustrate the generally frustoconical nature of the adapter element 104 and diffuser 124. The dosing structure 132 is also shown in FIGS. 4a and 4b. As described in connection with FIG. 3, the dosing structure 132 comprises the strut 134 and the dosing outlet pipe 136. In turn, the dosing outlet pipe 136 comprises the portion 135 (which is integral with the strut 134) and the nozzle portion 138. The nozzle portion 138 defines the fluid aperture 139 through which reductant liquid is expelled (into the dosing cup [not shown in FIG. 4a or 4b]). An outlet, 137, of the adapter element 104 is also indicated in FIG. 4b.

Figure 5:
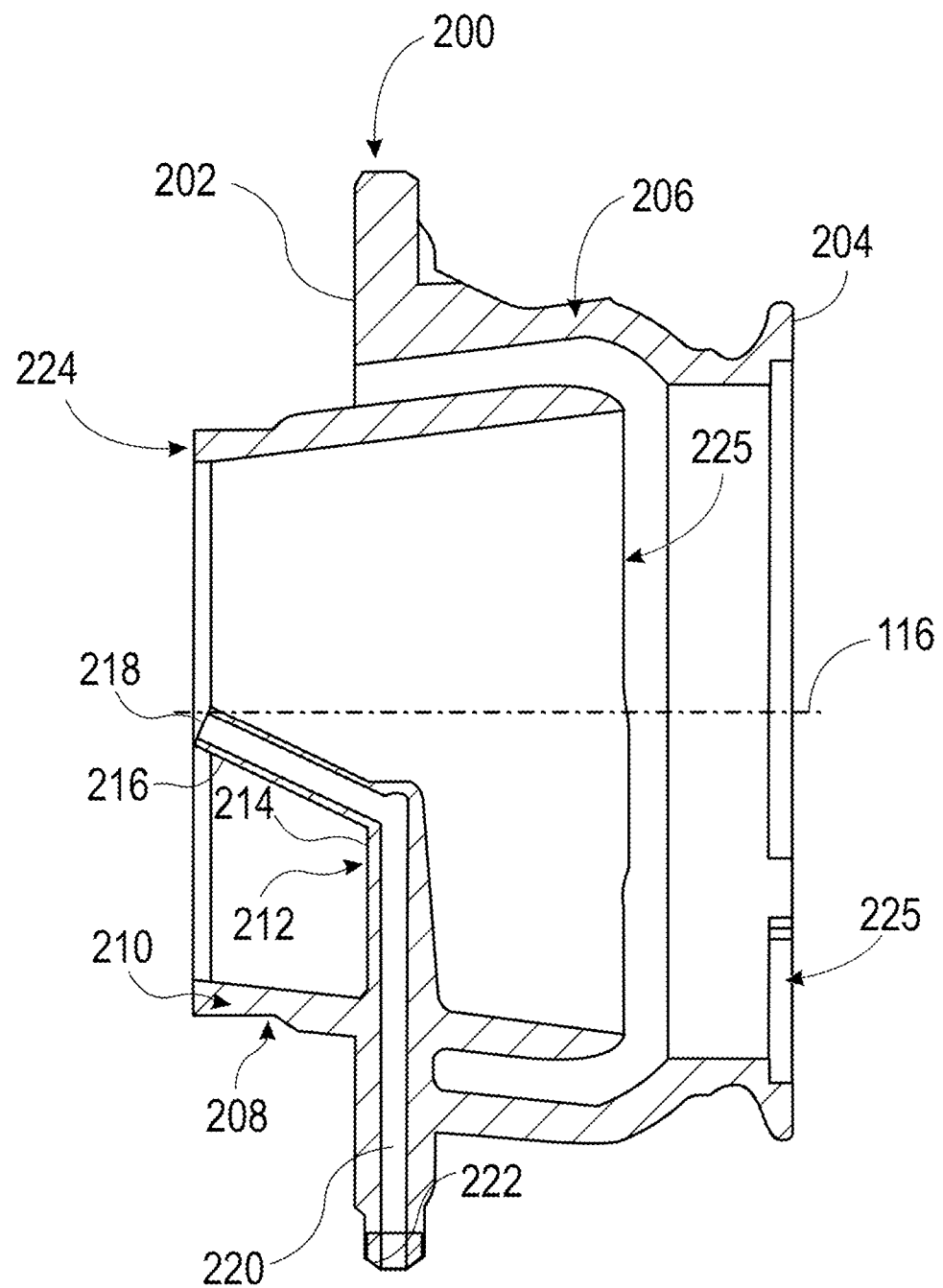
FIG. 5 is a cutaway side view of an adapter element, in isolation, according to another embodiment.

Turing to FIG. 5, a cutaway side view of adapter element 200, in accordance with another embodiment, is shown. The adapter element 200 shares many features in common with the adapter element 104 previously described, and those features will therefore not be described in detail.

Like the adapter element 104 previously described, the adapter element 200 is, in use, installed between a turbine and a downstream conduit (neither of which are shown in FIG. 5).

The adapter element 200 comprises a first connection portion 202 and a second connection portion 204. The first and second connection portions 202, 204 are configured to engage a turbine and a conduit respectively. An outer wall 206 extends between the first and second connection portions 202, 204. The connection portions 202, 204 take the form of flanges. However, other connection portions may otherwise be incorporated. The connection portions 202, 204 are provided at opposing ends of the outer wall 206.

Like adapter element 104, the adapter element 200 comprises an integral diffuser 208. The diffuser 208 comprises an inner wall 210. A dosing structure 212 is also incorporated, and is integrally formed with the inner wall 210 (and so diffuser 208 and adapter element 104 generally). Furthermore, the dosing structure 212 is also integrally formed with the outer wall 206 in this embodiment.

The dosing structure 212 comprises a strut 214 and a dosing outlet pipe 216. The strut 214 also extends between the inner wall 210 and the outer wall 206. Said portion, extending between the inner wall 210 and the outer wall 206, may be referred to as a connecting, or extension, portion. Defined in an end of the dosing outlet pipe 216 is a fluid outlet 218. A reductant conduit 220 runs through an entirety of the dosing structure 212. It is through the reductant conduit 220 that liquid reductant is received from a reductant source (not shown) and is then expelled through the fluid outlet 218 towards the turbine wheel (not shown). The dosing structure 212 may be connected to a reductant source via a fixture 222.

An inlet 224 of the diffuser 208 projects beyond the first connection portion 202 of the adapter element 200. This effectively means that the inlet 224 of the diffuser 208 can, in use, be provided closer to the turbine wheel, to influence exhaust flow at a position further upstream along the longitudinal axis 116. This arrangement advantageously protects the turbine housing from reductant fluid and/or by-products by providing, in effect, a sleeve (which may be, for example, stainless steel). That is to say, the projecting inlet 224 may provide a barrier, or screen, of sorts, which shields the turbine housing in use. The arrangement also facilitates connection of the adapter element 200 to different designs of turbine housing (among other components). The inlet 224 of the diffuser 208 also constitutes an inlet of the adapter element 200 generally.

A distinction of the adapter element 200, compared to the adapter element 104, is the dosing structure 212. As mentioned, the dosing structure 212 comprises the strut 214 and the dosing outlet pipe 216. In the adapter element 200, the strut 214 does not extend up to the longitudinal axis 116. Instead, a gap is provided between a radially outer end of the strut 212 and the longitudinal axis 116. Furthermore, the dosing outlet pipe 216 is angled towards the longitudinal axis 116, and is not aligned with it as was the case in FIG. 3. Advantageously reducing a height of the strut 214, and angling the dosing outlet pipe 216 towards the longitudinal axis 116, reduces the drag experienced by the exhaust gas flow as it flows through the diffuser 208 (past the dosing structure 214). Angling, or inclining, the dosing outlet pipe 216 is also advantageous in facilitating 'drain back' of the reductant fluid. In other words, reductant fluid is more likely to drain back through the dosing outlet pipe 216, under gravity, than exiting via the fluid aperture (e.g. proximate the dosing cup).

The diffuser 208 further comprises an outlet 225. The adapter element 200 further comprises outlet 227. The inlet 224 defines a first cross-sectional area. The outlet 225 defines a second cross-sectional area. The second cross-sectional area is greater than the first cross-sectional area.

The adapter element 200 advantageously reduces the leakage of reductant and provides access to the fixture 222 (meaning connection of the dosing system is more straightforward).

FIG. 6a is a cutaway side view of an adapter element 300 in accordance with another embodiment. The adapter element 300 shares many features in common with the adapter element 200, and only the differences will be described in detail.

The adapter element 300 comprises a plurality of projections which extend from an inner wall 302 of diffuser 304 to an outer wall 306. A first such projection is labelled 308, which is a reductant barrier. The reductant barrier 308 defines a blocking face 309, impermeable to the passage of liquids thereacross. As previously described, the reductant barrier 308, in use, reduces the risk that liquid reductant flows along the adapter element 300 and contacts a cast metal turbine housing (to which the adapter element 300 is engaged in use). The reductant barrier 308 only extends around a portion of a circumference defined by the longitudinal axis 116. That is to say, the reductant barrier 308 does not extend entirely around the adapter element 300, but instead only extends between a portion of a circumference of each of the inner and outer walls 302, 306. By virtue of the reductant barrier 308, a cavity 324 is defined behind the reductant barrier 308. However, in other embodiments the cavity 324 may be filled with material (i.e. there may be no such cavity 324).

A further variety of projection which extends between the inner and outer walls 302, 306 is swirl vane 310. In the illustrated arrangement the swirl vane 310 extends entirely between the inner wall 302 and outer wall 306. The vane 310 therefore also provides some structural support in supporting the diffuser 304 within the outer wall 306. However, in other arrangements the vane 310 may only extend from an outer surface 302b of the inner wall 302, but not actually extend up to the inner surface 306a of the outer wall 306. In further arrangements, the vane 310 may extend from the inner surface 306a of the outer wall 306 towards, but not up to, the outer surface 302b of the inner wall 302. Advantageously, having the vane only extend partway towards, but not up to, the inner surface 306a of the outer wall 306 means that less heat is transferred away from the diffuser 304. This is advantageous in maintaining a relatively high temperature of the diffuser 304, facilitating the effective dosing of reductant into the exhaust stream flow. This also advantageously improves the homogeneity of the diffuser surface temperature, which is desirable for reasons of reducing deposition of reductant fluid and/or by-products.

Given that the projection 310 is a vane, and therefore guides the fluid passing across it, it is anticipated that the adapter element 300 of FIG. 6a would be advantageously used in combination with a turbine which incorporates a wastegate. This is owing to the fact that, in such a turbine assembly, there would be a bypass flow of exhaust gas which flows between the inner and outer walls 302, 306. That is to say, in use, a generally annular recess 314 defined between inner and outer walls 302, 306 can define a bypass flow channel. The swirl vane 310 would therefore advantageously impart a swirl to the bypass flow passing through the bypass channel. Of note, part of the otherwise annular recess 314 is blocked, or obscured, by the reductant barrier 308, and a portion 317 of the dosing structure 312 which extends between the inner and outer walls 302, 306, as also shown in FIG. 6b. Imparting swirl to the bypass flow is advantageous in more evenly distributing the relatively hot bypass exhaust gases around the bypass flow channel, more evenly heating the diffuser 304 (specifically the inner wall 302 thereof) by convection. This may be particularly advantageous in embodiments incorporating a reductant barrier 308, where the associated mass of material may be a heatsink (e.g. heat may be transferred away from the diffuser 304 via the reductant barrier 308). The swirl vane 310 can also be used to heat up the diffuser 304 more quickly (following, for example, a key-on event after a period of inactivity). The swirl vane 310 can also be used to focus heating on a particular area, or region, of the diffuser 304.

Like the embodiments illustrated in FIGS. 3-5, the adapter element 300 incorporates an integral dosing structure 312.

For completeness, the diffuser 304, and adapter element 300, comprise an inlet 316. The diffuser 304 further comprises an outlet 318. The adapter element 300 further comprises an outlet 320. The inlet 316 and outlet 318 define first and second cross-sectional areas respectively, with the second cross-sectional area being greater than the first.

FIG. 6b is an end view of the adapter element 300 from the outlet 320 end (as shown in FIG. 6a). FIG. 6b illustrates the reductant barrier 308 extending between inner and outer walls 302, 306 respectively. Specifically, the blocking face 309 extends between the inner and outer walls 302, 306, over a portion of a circumference of the diffuser outlet 318. The dosing structure 312 is also shown, with the strut 313 extending from the inner wall 302. The dosing outlet pipe 315 extends from the strut 313. For completeness, the vane 310 is omitted in FIG. 6b.

Turning now to FIG. 7a, a schematic side view of part of a diffuser 400 according to another embodiment is provided. For reference, FIG. 7c is an end view and FIG. 7b is a top-down view of the cross-section indicated X-X in FIG. 7c.

Beginning with FIG. 7a, part of a diffuser 400 is illustrated, along with part of a dosing cup 402 which forms part of a turbine wheel (not visible in FIG. 7a). As for the previous embodiments, the diffuser 400 comprises an inner wall 404 which defines respective inner and outer surfaces 404a, 404b. It will be appreciated that the inner wall 404 may simply be referred to as a wall.

The diffuser 400 further comprises an integrally formed dosing structure 406, through which liquid reductant is dosed. Like with the previous embodiments, the dosing structure 406 comprises a strut 408 that extends from the inner surface 404a of the inner wall 404. Unlike the previous embodiments, in this arrangement the strut 408 may extend past the longitudinal axis 116 and project towards an adjacent region of the inner surface 404a of the inner wall 404 (e.g. at a diametrically opposed region to which the strut 408 extends from). In such arrangements, it is advantageous that a radially outer end 408a (of the strut 408) does not contact the adjacent region of the inner wall 404. Instead, a gap 410 remains between the radially outer end 408a and the adjacent inner surface 404a of the inner wall 404. Incorporation of the extended strut 408, as shown in FIG. 7a, is advantageous because any effect which the strut 408 has on the exhaust flow may affect a greater proportion of the flow (e.g. may more evenly effect the flow).

The dosing structure 406 further comprises a dosing outlet pipe 410, which extends from the strut 408. As indicated with dashed lines in FIG. 7a, a conduit 412 extends through the strut 408, and the dosing outlet pipe 410, through which reductant flows.

As was the case for previous embodiments, the dosing outlet pipe 410 defines a fluid outlet 414 through which reductant is expelled from the dosing structure 406. In the FIG. 7a arrangement the fluid outlet 414 is positioned axially within the dosing cup 402. However, in other arrangements there may be a greater axial offset between the fluid outlet 414 and the dosing cup 402. The fluid outlet pipe 410 is aligned with the longitudinal axis 116 in this embodiment, in that it generally extends along the longitudinal axis 116. The dosing outlet pipe 410 may therefore be said to point directly towards the dosing cup 402.

Turning to FIG. 7c, an end view of the diffuser 400 is provided from a dosing cup 402 end of FIG. 7a. It is noted that in both FIGS. 7a and 7c the diffuser 400 is shown in isolation of any surrounding component (save for the dosing cup 402 in FIG. 7a). it will be appreciated that the diffuser 400 may be incorporated in an adapter element, like that shown in FIGS. 3-6, or the diffuser may instead be a standalone component which, for example, may be directly mounted within a turbine housing (such as via a mounting flange) as per FIG. 8a onwards.

The end view of FIG. 7c shows the dosing structure 406, including the strut 408, the dosing outlet pipe 410 and fluid outlet 414. FIG. 7c also shows mixing elements 416, 418 which extend from the strut 408. The mixing elements 416, 418, as suggested by the name, provide an enhanced mixing effect in the exhaust stream passing through the diffuser 400. For example, the mixing elements 416, 418 may maintain a swirl of the flow it leaves the turbine wheel (not shown in FIG. 7a or 7c, but would be positioned downstream of the dosing cup 402) or enhance a swirl of the flow. Alternatively, or in combination, the mixing elements 416, 418 may enhance the dispersal of reductant in the exhaust stream.

As indicated by the dashed line in FIG. 7c, labelled 420, 422, the mixing element can be provided in a range of different positions. The mixing elements may have a profile which facilitates the mixing, or dispersal, of reductant into the exhaust stream. For example, the mixing elements 416, 418 may have a generally aerodynamic profile, such as an aerofoil. Any of the mixing elements 416, 418, 420, 422 may be considered to constitute an extension, or portion, of the strut 408.

As indicated by the cross-section marked X-X in FIG. 7c, FIG. 7b shows a cross-section profile of the strut 408 at two different radial positions of the strut 408. Put another way, the cross-sections indicated in FIG. 7b show how the cross-sectional profile of the strut 408 varies along a height of the strut 408. A first cross-section profile 424 may be proximate the inner surface 404a of the inner wall 404 (e.g. where the strut 408 extends from). A second profile 426 may be proximate the longitudinal axis 116. The two profiles 424, 426 indicate a generally twisting aerofoil shape of the strut 408. It will be appreciated that between the two different cross-sections shown in FIG. 7b, the cross-sectional geometry of the strut 408 may transition between the geometries. As such, the profile of the strut 408 may generally twist moving towards the longitudinal axis 116. It will be appreciated that a range of other geometries may otherwise be incorporated, depending upon a desired functionality of the strut 408. A twisting geometry may also be incorporated in the mixing elements 416, 418. Advantageously, atomised reductant may decompose faster, and present a more uniform distribution of ammonia to the catalyst, where the turbine wheel exit flow is improved, in a centre of the diffuser, by virtue of a changing cross-section profile of the strut 408.

Figure 8A:
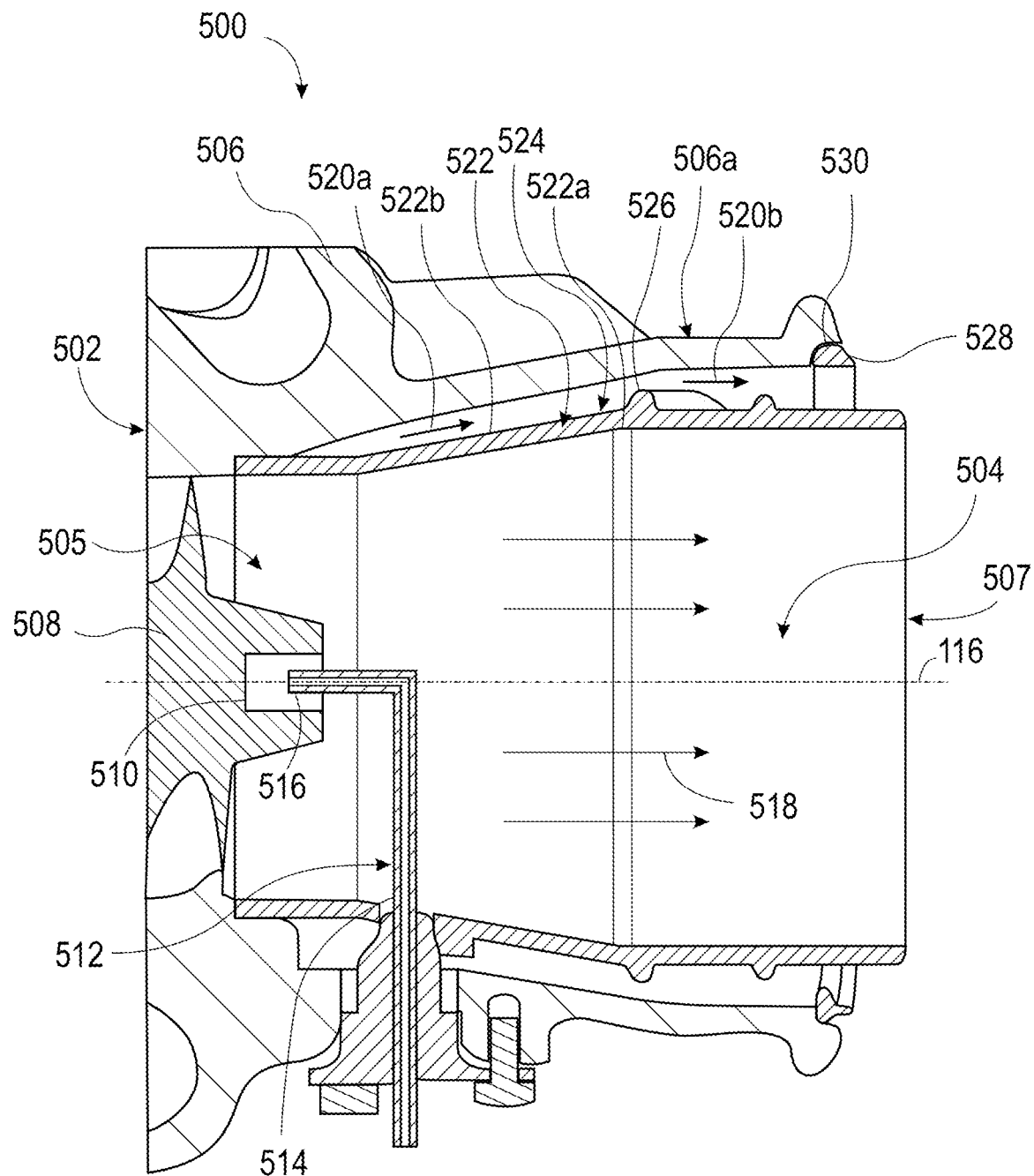
FIG. 8a is a cutaway side view of a turbine assembly, incorporating a diffuser, in accordance with another embodiment.

FIG. 8*a* is a cutaway side view of part of a turbine assembly 500 according to another embodiment of the disclosure. The turbine assembly 500 comprises a turbine 502 (partly visible in FIG. 8*a*) and a diffuser 504. The turbine 502 comprises a turbine housing 506 and a turbine wheel 508 (both of which are only partly visible in FIG. 8*a*). The turbine wheel 508 comprises a dosing cup 510. The turbine wheel 508 rotates about an axis that is collinear with longitudinal axis 116. The turbine wheel 508 may therefore be said to rotate about the longitudinal axis 116.

Unlike the previous embodiments, in the present embodiment the diffuser 504 does not form part of an adapter element. Instead, in the present embodiment the diffuser 504 is directly supported by, and mounted within, the turbine housing 506. This will be described in detail below. Further distinctions of note include the dosing structure 512 being a separate assembly which is inserted through apertures in both the turbine housing 506 and the diffuser 504 (specifically through a wall 518 thereof). The dosing structure 512 comprises a strut 514 and a dosing outlet pipe 516, with a fluid outlet (not shown in FIG. 8*a*) pointing towards, and being received within, the dosing cup 510. The separate nature of the dosing structure 512 is not a focus of the present application.

The diffuser 504 comprises an inlet 505, defining a first cross-sectional area, and a downstream outlet 507, defining a second cross-sectional area. As illustrated in FIG. 8*a*, the second cross-sectional area is larger than the first cross-sectional area.

The turbine 502 is a wastegated turbine. As such, in use two exhaust flows will flow, or pass, through the turbine assembly 500: a primary, or core, exhaust flow 518, and a bypass, or secondary, flow, 520*a*, 520*b*. The flows may otherwise be described as streams, e.g. first and second streams.

The primary exhaust flow 518 flows through the diffuser 504 (having been expanded across the turbine wheel 508). The bypass flow 520*a*, 520*b* flows between the diffuser 504 and the turbine housing 506 (having been diverted around the turbine wheel 508, via a wastegate [not shown in FIG. 8*a*]). It will be appreciated that the bypass flow is a generally annular flow field. The bypass flow 520*a*, 520*b* extends between a wall 522 of the diffuser 504 and the turbine housing 506 (specifically an outlet portion 506*a* of the turbine housing 506). The bypass flow 520*a*, 520*b* can be said to flow through a bypass channel 524 which is a generally annular recess, or cavity, defined between an outer surface 522*b* of the wall 522 of the diffuser 504 and the turbine housing 506.

A plurality of projections extend from an outer wall 522*a* of the wall 522. Said projections may otherwise be said to extend from the diffuser 504. Different varieties of projection will now be described in turn.

Firstly, a helical projection 526, which may otherwise be described as a swirl vane, extends from the outer surface 522*b* of the wall 522. The helical projection extends, as suggested by the name, in a helical manner. The helical projection 526 extends around the wall 522, at least part way along the longitudinal axis 116. The helical projection 526 may otherwise be described as corkscrew-like in shape.

Incorporation of the helical projection 526 is advantageous because a swirl is imparted to the bypass flow 520*a*, 520*b*. If the helical projection 526 was not present, the bypass flow 520*a*, 520*b*, having passed through the wastegate (not shown) upstream of the turbine wheel, would pass along the bypass channel 524 in a relatively linear manner. In some instances, this may lead to cold spots on the diffuser 504 (i.e. regions of the diffuser 504 which are not heated by the bypass flow 520*a*, 520*b*). By incorporating the helical projection 526, a swirl is imparted to the relatively hot bypass flow 520*a*, 520*b* such that the wall 522 of the diffuser 504 is more evenly heated, by convection, by the bypass flow 520*a*, 520*b*. This can reduce the extent of peppering of reductant on the diffuser 504, specifically the inner surface 522*a* of the wall 522 thereof, whereby liquid reductant condenses on the diffuser 504.

The helical projection 526 does not extend to the turbine housing 506 in the illustrated embodiment, specifically the outlet portion 506*a* thereof. Instead, a gap is provided between a radially outer end of the helical projection 526 and an adjacent surface of the turbine housing 506. Said adjacent surface may be referred to as an inner surface of an outer wall. As described in connection with previous embodiments, leaving a gap, such that the projection 526 does not contact the turbine housing 506, is advantageous because it is desirable to reduce heat transfer away from the diffuser 504. This is at least because the diffuser 504 operates more effectively at a higher temperature. By leaving a gap between the radially outer end of the helical projection 526 and the adjacent surface of the turbine housing 506, a potential conduction path across the diffuser 504 is broken.

Although the helical projection 526 is a single helical projection in the illustrated embodiment, it will be appreciated that a plurality of helical projections could otherwise be incorporated. For example, an array of corkscrew-shaped swirl vanes may be incorporated in the diffuser 504, specifically extending from an outer surface 522*b* of a wall 522 thereof.

The diffuser 504 is mounted within the turbine housing 506 via a mounting flange 528. The diffuser 504, specifically the mounting flange 528 thereof, engages a recess 530 defined in the turbine housing 506 (preferably proximate an outlet end thereof). The recess 530 is an annular recess in the illustrated embodiment. The mounting flange 528 engages the turbine housing 506. The mounting flange 528 is connected to the wall 522 of the diffuser by one or more projections. The projections may comprise generally circumferential projections and/or a reductant barrier. These will be described in more detail in connection with FIG. 8*b* onwards. The mounting flange 528 is an annular body which extends around the wall 522.

Figure 8B:
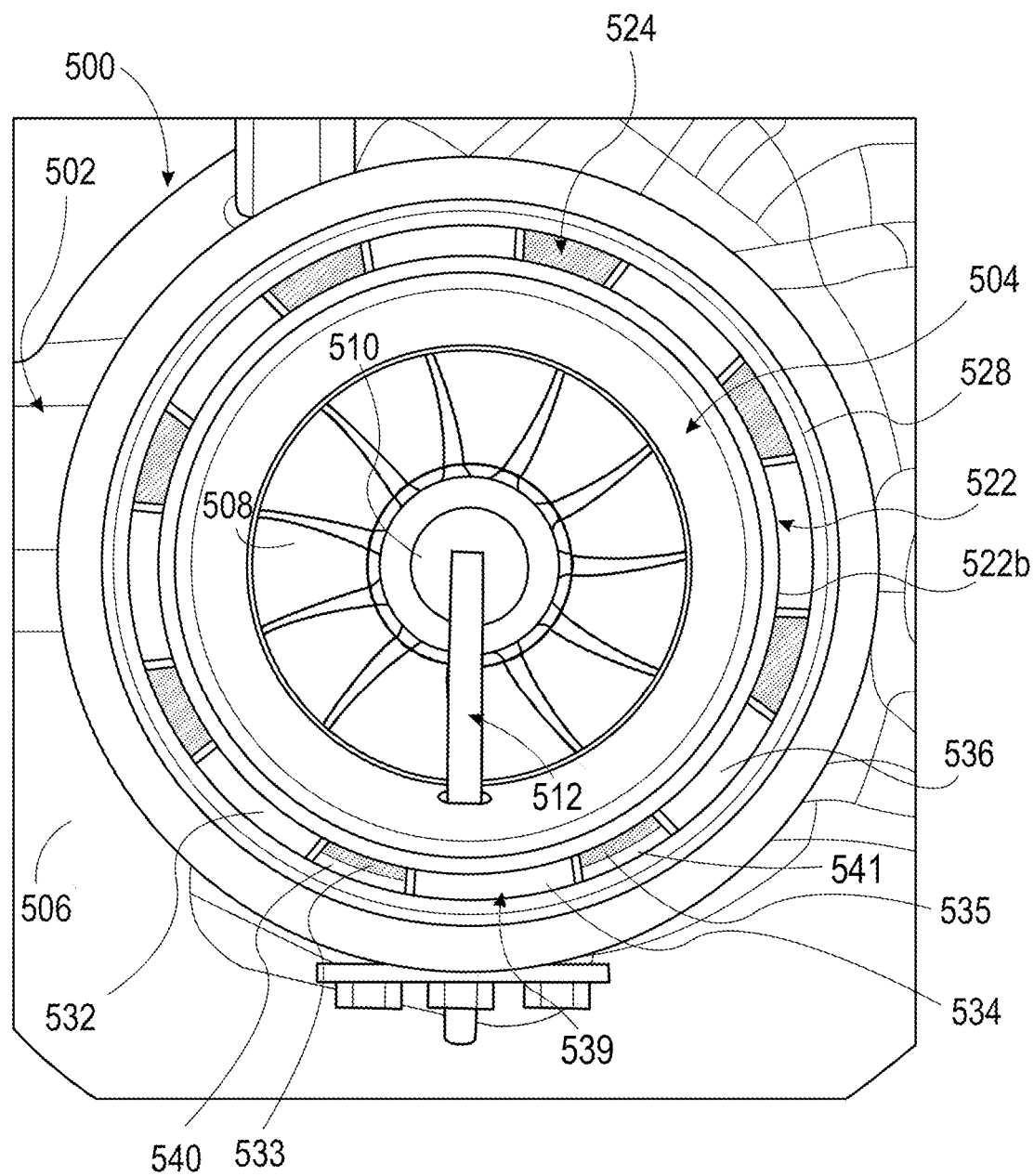
FIG. 8b is an end view of the turbine assembly shown in FIG. 8b.

Turning to FIG. 8*b*, an end view from an outlet end of the turbine assembly 500 (e.g. from the right hand side, looking to the left hand side, of FIG. 8*a*) is provided. The turbine wheel 508, dosing cup 510 and dosing structure 512 are also visible in FIG. 8*b*.

As shown in FIG. 8*b*, the mounting flange 528 is connected to the outer surface 522*b* of the wall 522 by plurality of projections 532, 534, 536, (only three of which are labelled in FIG. 8*b*). The projections 532, 534, 536 are generally circumferential projections and extend around part of a circumference about the longitudinal axis 116. Given that the projections 532, 534, 536 extend between the wall 522 and mounting flange 528, the projections 532, 534, 536 may be described as struts, spokes or supports. The projections 532, 534, 536, along with the mounting flange 528, facilitate the mounting, and alignment, of the diffuser 504 within the turbine housing 506.

Openings 533, 535 (only two of which are labelled in FIG. 8*b*) are defined between the projections 532, 534, 536.

Bypass flow, passing through bypass channel 524, exits the turbine assembly 500 via the openings 533, 535.

The generally circumferential projections 532, 534, 536 may be described as stabilisation vanes in that they are angled slightly relative to a plane normal to the longitudinal axis 116. The projections 532, 534, 536 therefore direct the bypass flow, which passes through the bypass channel 524, towards the openings 533, 535 defined between the projections 532, 534, 536. This is advantageous because, if the bypass flow was to directly impinge a rear face of a projection aligned normal to the longitudinal axis 116, turbulent eddies, and general reductions of efficiency of the arrangement, may result. The bypass flow is therefore guided through the openings 533, 535 by the projections 532, 534, 536. In other embodiments, the generally circumferential projections 532, 534, 536 may not extend across the entire bypass channel 524. That is to say, the projections may extend from only one of the mounting flange 528 or outer surface 522b of the wall 522, and there may be a gap provided between the projection(s) and the other of the outer surface 522b or mounting flange 528.

Also visible in FIG. 8b is a reductant barrier 539, comprising blocking faces 540, 541 and projection 534. The reductant barrier 539 projects from a radially outer portion of the mounting flange 528 towards the longitudinal axis. As previously described, the reductant barrier 539 reduces the risk that liquid reductant flows towards, and contacts, the cast metal turbine housing 506, which otherwise risks corrosion to the turbine housing 506. The blocking faces 540, 541 do not extend entirely between the wall 522 and the mounting flange 528. Instead, the blocking faces 540, 541 only extend partway between the wall 522 and the mounting flange 528, from a radially outer portion of the mounting flange 540. This is owing to openings 533, 535. In other embodiments the reductant barrier 539, and associated blocking face(s), may extend entirely between the wall 522 and the mounting flange 528 (e.g. across the entire bypass channel 524).

Figure 9:
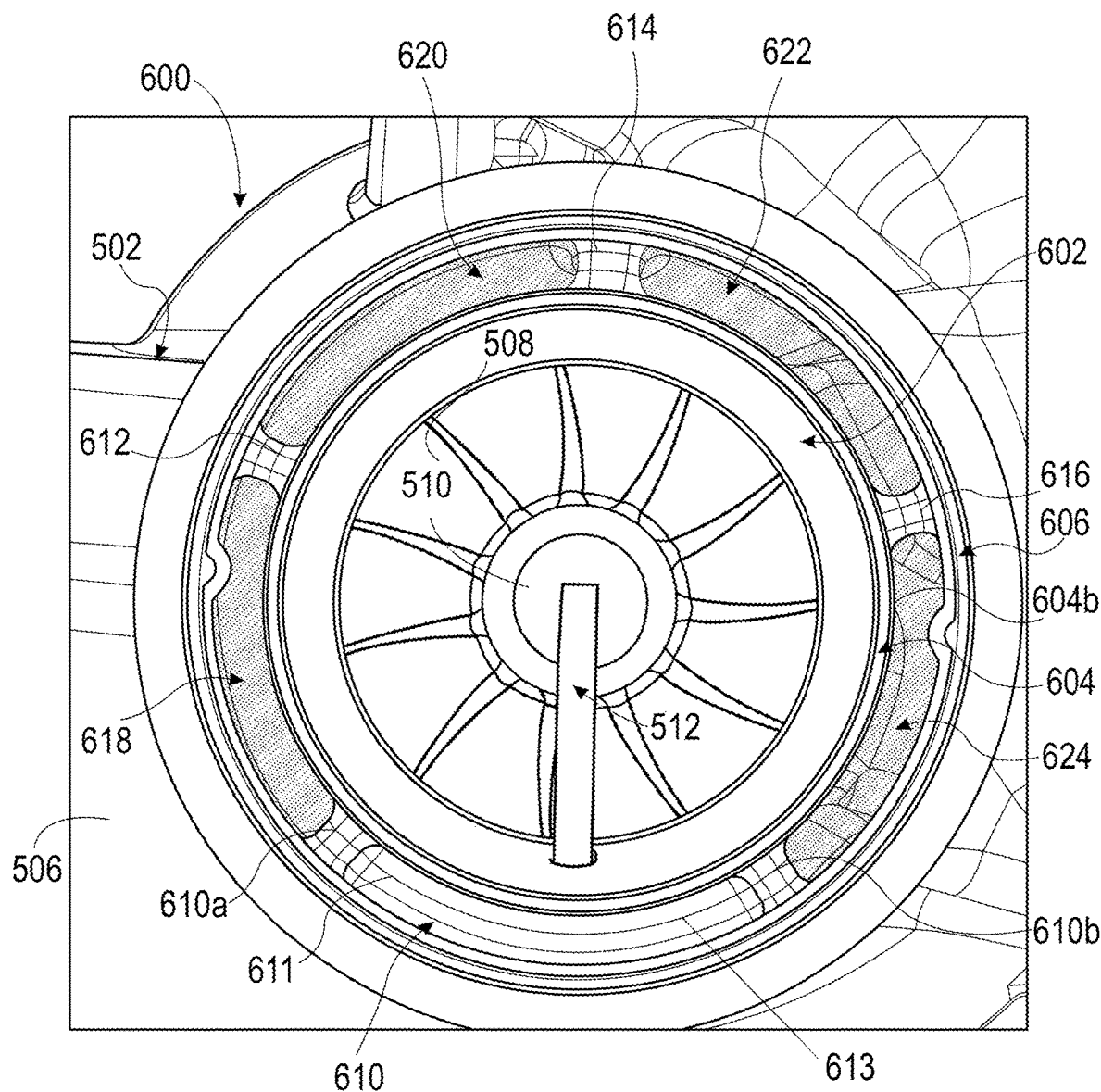
FIG. 9 is an end view of a turbine assembly, incorporating a diffuser, according to another embodiment.

FIG. 9 is an end view from an outlet end of a turbine assembly 600 according to another embodiment. The turbine assembly 600 comprises the turbine 502 described in connection with FIGS. 8a and 8b, including the turbine housing 506 turbine wheel 508, dosing cup 510 and dosing structure 512.

The turbine assembly 600 further comprises a diffuser 602 comprising a wall 604. The diffuser 602 shares many features in common with the diffuser 504, and only the differences will be described in detail.

The diffuser 602 comprises a mounting flange 606. The mounting flange 606 engages the turbine housing 506 to mount the diffuser 602 in situ. A plurality of projections 608, 610, 612, 614, 616 extend between the wall 604 (specifically an outer surface 604b thereof) and the mounting flange 606. As described in connection with FIGS. 8a and 8b, openings 618, 620, 622, 624 are defined between the projections 610, 612, 614, 616 through which bypass flow can pass.

Lowermost projection 610, as illustrated in FIG. 9, comprises a reductant barrier 611. The reductant barrier 611 defines a blocking face 613. The reductant barrier 611 effectively extends, in an arcuate manner, between projections 610a, 610b which define outer ends of the projection 610. The reductant barrier 611 extends, in a continuous manner, between the mounting flange 606 and the outer surface 604b of the wall 606. At least a portion of the reductant barrier 611 is recessed relative to the other projections 612, 614, 616, which may provide an even greater volume for 'collecting' liquid reductant. In other embodiments, the reductant barrier 611 may be substantially aligned with the other projections 612, 614, 616.

The adapter elements 104, 200, 300, and diffusers 400, 504, 602 may be manufactured by an additive manufacture process or by an investment casting process. The adapter elements 104, 200, 300, and diffusers 400, 504, 602, may be manufactured from stainless steel. Advantageously, stainless steel is resistant to corrosion (from, for example, reductant).

The diffusers 400, 504, 602 may be secured to a turbine housing using a press-fit, fastener or some other means of attachment.

Any variety of wall, projection or vane disclosed herein may have a hollow geometry (e.g. incorporating a cavity). Any variety of wall, projection or vane disclosed herein may incorporate a mesh, or lattice, structure (e.g. cavities defined by ribs). Advantageously, such features are both robust and have low thermal inertia, with the opportunity to incorporate further flow paths.

Whilst the integral dosing structures in this document have been described in connection with adapter elements, it will be appreciated that said integral dosing structures could alternatively be provided as part of a turbine housing. Any such features described in connection with adapter elements are therefore equally applicable to turbine housing arrangements which also incorporate an integral dosing structure.

A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the disclosure to be integrally formed and include a variety of features not possible when using prior manufacturing methods.

Additive manufacturing methods described herein enable manufacture to any suitable size and shape with various features which may not have been possible using prior manufacturing methods. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes. Binder Jetting has been found to be particularly effective for manufacturing the components disclosed herein.

The additive manufacturing processes described herein may be used for forming components using any suitable material. For example, the material may be metal or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in additive manufacturing processes which may be suitable for the fabrication of examples described herein.

As noted above, the additive manufacturing process disclosed herein allows a single component to be formed from multiple materials. Thus, the examples described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on three-dimensional (3D) information, for example a three-dimensional computer model (or design file), of the component.

Accordingly, examples described herein not only include products or components as described herein, but also methods of manufacturing such products or components via additive manufacturing and computer software, firmware or hardware for controlling the manufacture of such products via additive manufacturing.

The structure of one or more parts of the product may be represented digitally in the form of a design file. A design file, or computer aided design (CAD) file, is a configuration file that encodes one or more of the surface or volumetric configuration of the shape of the product. That is, a design file represents the geometrical arrangement or shape of the product.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (0.3 mf) files, Autodesk (3 ds) files, Collada (.dae) files and Wavefront (.obj) files, although many other file formats exist.

Design files can be produced using modelling (e.g. CAD modelling) software and/or through scanning the surface of a product to measure the surface configuration of the product.

Once obtained, a design file may be converted into a set of computer executable instructions that, once executed by a processor, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the product. These can be printed either in assembled or unassembled form. For instance, different sections of the product may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The described and illustrated embodiments are to be considered as illustrative and not restrictive in character, it being understood that only preferred embodiments have been shown and described and that all changes and modifications that come within the scope of the disclosures as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

The invention claimed is:

1. An adapter element for a turbine, the adapter element defining a longitudinal axis and comprising:
   a first connection portion disposed proximate a first, inlet end of the adapter element, configured to engage the turbine;
   a second connection portion disposed proximate a second, outlet end of the adapter element, configured to engage a conduit;
   an outer wall that extends between the first and second connection portions, the outer wall defining an inner surface and an outer surface; and
   a dosing structure configured to receive, and expel, reductant;
   wherein a cross-sectional area of a flow passage defined by the adapter element, normal to the longitudinal axis, is greater at the second end than at the first end of the adapter element.

2. The adapter element according to claim 1, wherein a portion of the inner surface of the outer wall is outwardly offset proximate the dosing structure.

3. The adapter element according to claim 2, wherein the inner surface of the outer wall is offset by an annular recess which extends at least partly circumferentially around the outer wall.

4. The adapter element according to claim 1, further comprising:
   a diffuser attached to the inner surface of the outer wall, the diffuser comprising:
     an inlet configured to receive fluid from the turbine;
     an outlet, in fluid communication with the inlet, configured to exhaust fluid from the turbine;
     an inner wall, which extends between the inlet and the outlet, defining an inner surface and an opposing outer surface, the inner surface defining the flow passage;
   wherein a portion of the inner surface of the inner wall is outwardly offset proximate the dosing structure.

5. The adapter element according to claim 1, wherein the dosing structure comprises:
   a strut, proximate the outer wall; and
   a dosing outlet pipe, which extends from the strut and defines a fluid outlet.

6. The adapter element according to claim 1, wherein the cross-sectional area of the flow passage increases linearly from the first end to the second end.

7. The adapter element according to claim 5, wherein the strut projects towards, but not up to, the longitudinal axis defined by the adapter element, and the dosing outlet pipe is angled towards the longitudinal axis.

8. The adapter element according to claim 5, wherein the strut projects towards the longitudinal axis defined by the adapter element.

9. The adapter element according to claim 1, further comprising:
   a diffuser attached to the inner surface of the outer wall, the diffuser comprising:

an inlet configured to receive fluid from the turbine;
an outlet, in fluid communication with the inlet, configured to exhaust fluid from the turbine; and
an inner wall, which extends between the inlet and the outlet, defining an inner surface and an opposing outer surface, the inner surface defining the flow passage;
wherein one or more projections extend from the outer surface of the inner wall.

10. The adapter element according to claim 9, wherein the one or more projections comprises one or more helical projections.

11. The adapter element according to claim 9, wherein the one or more projections comprises one or more generally circumferential projections.

12. The adapter element according to claim 1, further comprising:
a diffuser attached to the inner surface of the outer wall, the diffuser comprising:
an inlet configured to receive fluid from the turbine;
an outlet, in fluid communication with the inlet, configured to exhaust fluid from the turbine; and
an inner wall, which extends between the inlet and the outlet, defining an inner surface and an opposing outer surface, the inner surface defining the flow passage;
wherein the outer surface of the inner wall comprises a lattice.

13. The adapter element according to claim 1, further comprising:
a diffuser attached to the inner surface of the outer wall, the diffuser comprising:
an inlet configured to receive fluid from the turbine;
an outlet, in fluid communication with the inlet, configured to exhaust fluid from the turbine; and
an inner wall, which extends between the inlet and the outlet, defining an inner surface and an opposing outer surface, the inner surface defining the flow passage;
wherein an end of the outer wall, distal the turbine, defines an adapter element outlet; and
wherein the outlet of the diffuser is axially recessed within the adapter element outlet.

14. A turbine assembly comprising:
a turbine; and
the adapter element according to claim 1 coupled to an outlet of the turbine.

15. A turbocharger comprising:
a compressor;
a bearing housing; and
the turbine assembly according to claim 14, wherein the turbine and compressor are in power communication.

16. A turbine housing for a turbine, the turbine housing comprising:
an inlet configured to receive exhaust gas;
a wheel cavity configured to receive a turbine wheel;
an outlet in fluid communication with the inlet;
an outer wall extending at least partway between the inlet and the outlet; and
a dosing structure configured to receive, and expel, reductant;
wherein at least part of the dosing structure is integrally formed with, and projects from, the outer wall.

17. The turbine housing according to claim 16, further comprising:
a diffuser attached to the outer wall, the diffuser comprising:
an inlet configured to receive fluid from the turbine;
an outlet, in fluid communication with the inlet, configured to exhaust fluid from the turbine; and
an inner wall, which extends between the inlet and the outlet, defining an inner surface and an opposing outer surface.

18. The turbine housing according to claim 17, wherein the diffuser is integrally formed with the outer wall.

19. A non-transitory computer-readable medium comprising computer executable instructions that, when executed by a processor, cause the processor to control an additive manufacturing apparatus to manufacture an adapter element according to claim 1.

20. A method of manufacturing an adapter element according to claim 1, via additive manufacturing, the method comprising:
obtaining an electronic file representing a geometry of the adapter element; and
controlling an additive manufacturing apparatus to manufacture, over one or more additive manufacturing steps, the adapter element according to the geometry specified in the electronic file.

21. A turbine assembly comprising:
a turbine, the turbine comprising a turbine housing and a turbine wheel, the turbine housing comprising:
an inlet;
a wheel cavity that receives the turbine wheel, the wheel cavity being disposed downstream of the inlet; and
an outlet, the outlet being disposed downstream of the wheel cavity; and
an adapter element coupled to the outlet of the turbine housing, the adapter element defining a longitudinal axis and comprising:
a first connection portion coupled to the outlet of the turbine;
a second connection portion configured to engage a conduit;
an outer wall that extends between the first and second connection portions, the outer wall defining an inner surface and an outer surface; and
a dosing structure configured to receive, and expel, reductant.

* * * * *